(12) United States Patent
Son et al.

(10) Patent No.: US 10,401,688 B2
(45) Date of Patent: Sep. 3, 2019

(54) DISPLAY DEVICE

(71) Applicant: Samsung Display Co., Ltd., Yongin-si, Gyeonggi-do (KR)

(72) Inventors: Jeong Man Son, Suwon-si (KR); Min Wook Park, Cheonan-si (KR); Jong-Keun Kim, Seoul (KR); Sang-Je Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 435 days.

(21) Appl. No.: 15/220,288

(22) Filed: Jul. 26, 2016

(65) Prior Publication Data

US 2017/0059942 A1    Mar. 2, 2017

(30) Foreign Application Priority Data

Aug. 24, 2015 (KR) ......................... 10-2015-0119127

(51) Int. Cl.
*G02F 1/1337* (2006.01)
*G02F 1/1335* (2006.01)
(Continued)

(52) U.S. Cl.
CPC ...... *G02F 1/133753* (2013.01); *G02F 1/1368* (2013.01); *G02F 1/13394* (2013.01);
(Continued)

(58) Field of Classification Search
CPC ................. G02F 1/13624; G02F 2001/134345
See application file for complete search history.

(56) References Cited

U.S. PATENT DOCUMENTS

2001/0006408 A1    7/2001 Matsuyama et al.
2005/0117098 A1*   6/2005 Kurasawa ......... G02F 1/133371
                                                              349/114
(Continued)

FOREIGN PATENT DOCUMENTS

JP    2004-302174 A    10/2004
JP    2006-106137 A     4/2006
(Continued)

OTHER PUBLICATIONS

European Search Report for EP Application No. 16184703.3, dated Dec. 6, 2016, pp. 1-8.

*Primary Examiner* — Joseph L Williams
*Assistant Examiner* — Jacob R Stern
(74) *Attorney, Agent, or Firm* — Innovation Counsel LLP

(57) ABSTRACT

An exemplary embodiment of the present disclosure provides a display device including a first substrate including a plurality of unit regions, a unit electrode portion disposed on the first substrate in one unit region, an opposed electrode facing the unit electrode portion, a liquid crystal layer interposed between the unit electrode portion and the opposed electrode, and a protrusion interposed between the first substrate and the liquid crystal layer and protruded toward the liquid crystal layer. The protrusion includes a pair of horizontal portions facing each other and including a side parallel to a first direction, a pair of vertical portions facing each other and including a side parallel to a second direction different from the first direction, and at least one corner portion including a first oblique side parallel to a direction oblique with respect to the first and second directions.

27 Claims, 20 Drawing Sheets

(51) Int. Cl.
*G02F 1/1343* (2006.01)
*G02F 1/1339* (2006.01)
*G02F 1/1368* (2006.01)
*G02F 1/1362* (2006.01)

(52) U.S. Cl.
CPC .... *G02F 1/13439* (2013.01); *G02F 1/133514* (2013.01); *G02F 1/133707* (2013.01); *G02F 1/134336* (2013.01); *G02F 1/13624* (2013.01); *G02F 2001/13398* (2013.01); *G02F 2001/133742* (2013.01); *G02F 2001/133761* (2013.01); *G02F 2001/133776* (2013.01); *G02F 2001/134345* (2013.01); *G02F 2201/123* (2013.01)

(56) References Cited

U.S. PATENT DOCUMENTS

| | | |
|---|---|---|
| 2005/0200789 A1 | 9/2005 | Nakanishi |
| 2014/0267994 A1 | 9/2014 | Ryu et al. |

FOREIGN PATENT DOCUMENTS

| | | |
|---|---|---|
| KR | 10-2006-0104707 A | 10/2006 |
| KR | 10-2006-0128416 A | 12/2006 |
| KR | 10-2012-0028995 A | 3/2012 |
| KR | 10-2012-0030587 A | 3/2012 |
| KR | 10-2013-0008585 A | 1/2013 |
| KR | 10-2013-0101325 A | 9/2013 |
| KR | 10-2014-0061611 A | 5/2014 |

\* cited by examiner

DISPLAY DEVICE

CROSS-REFERENCE TO RELATED APPLICATION

This application claims priority to and the benefit of Korean Patent Application No. 10-2015-0119127 filed in the Korean Intellectual Property Office on Aug. 24, 2015, the entire contents of which are incorporated herein by reference.

BACKGROUND (a) Technical Field

The present disclosure is related to a display device, and more particularly, to a liquid crystal display of a vertical alignment (VA) mode.

(b) Description of the Related Art

A display device, such as a liquid crystal display (LCD), an organic light emitting diode (OLED) display, or the like, generally includes a display panel including a plurality of pixels for displaying an image.

The display panel of a liquid crystal display includes a liquid crystal layer including liquid crystal molecules, an electric field generating electrode for controlling alignment of the liquid crystal molecules in the liquid crystal layer, a plurality of signal lines for applying a voltage to at least some of the electric field generating electrodes, and a plurality of switching elements connected thereto. When a voltage is applied to the electric field generating electrode, an electric field is generated in the liquid crystal layer, thereby realigning the liquid crystal molecules. Accordingly, an image may be displayed by adjusting an amount of transmitted light. The display panel may include at least one polarizer to control an amount of transmitted light.

The electric field generating electrode included in the liquid crystal display includes a pixel electrode for receiving a data voltage and an opposed electrode for receiving a common voltage. The pixel electrode may receive a data voltage through the switching element, which may be formed of, e.g., a thin film transistor. The pixel electrode and the opposed electrode may be configured to face each other with the liquid crystal layer interposed therebetween, or may be disposed on the same side with respect to the liquid crystal layer.

Each pixel may display a primary color, such as red, green, blue, or the like.

Among liquid crystal displays, there is a vertical alignment (VA) mode in which liquid crystal molecules are arranged such that major axes thereof are aligned mainly vertically with respect to a surface of the display panel when an electric field is not applied to the liquid crystal layer. A liquid crystal display implementing the vertical alignment (VA) mode generally has a high contrast ratio and a wide standard view angle in comparison with other liquid crystal displays.

To achieve a wide view angle in a liquid crystal display implementing the vertically aligned mode, a plurality of subregions or domains having different alignment directions of liquid crystal molecules may be formed in one pixel. An example of a method for forming a plurality of domains may include forming a cutout, such as a slit, in the electric field generating electrode. In the case in which a cutout is formed in the electric field generating electrode, a fringe field is formed by an edge of the cutout, which realigns the liquid crystal molecules. Accordingly, a plurality of domains may be formed.

The liquid crystal molecules in each domain or subregion are tilted mainly in the same direction.

An initial alignment method is used for hastening a response speed and implementing a wide viewing angle. The initial alignment method provides a pretilt to the liquid crystal when an electric field is not applied to a liquid crystal layer. In order to provide pretilts having various predetermined directions to the liquid crystal molecules, an alignment layer having various alignment directions may be employed, or an alignment aid may be added to a liquid crystal layer or an alignment layer and cured after applying an electric field to the liquid crystal layer.

However, to manufacture a liquid crystal display including an alignment aid for a pretilt, an additional process line for an alignment aid, an ultraviolet ray curing process, and the like are often required, which would lead to extra cost. Therefore, problems of increasing manufacturing cost of a liquid crystal display, requiring additional manufacturing equipment, and complicating a manufacturing process exist. The above information disclosed in this Background section is only for enhancement of understanding of the background of the present disclosure and therefore may contain information that does not form the prior art that is already known in this country to a person of ordinary skill in the art.

SUMMARY

The present disclosure describes a liquid crystal display having advantages of being capable of increasing liquid crystal alignment controllability and transmittance thereof.

An exemplary embodiment of the present disclosure provides a display device including: a first substrate including a plurality of unit regions; a unit electrode portion disposed on the first substrate and disposed in one unit region; an opposed electrode facing the unit electrode portion; a liquid crystal layer including a plurality of liquid crystal molecules interposed between the unit electrode portion and the opposed electrode; and a protrusion interposed between the first substrate and the liquid crystal layer and protruded toward the liquid crystal layer, wherein the protrusion includes: a pair of horizontal portions facing each other with respect to a center of the unit electrode portion and including a side parallel to a first direction; a pair of vertical portions facing each other with respect to the center of the unit electrode portion and including a side parallel to a second direction different from the first direction; and at least one corner portion including a first oblique side parallel to a direction oblique with respect to the first and second directions.

The first oblique side and the first direction may form an acute angle that is equal to or greater than about 40° and less than about 90°.

The horizontal portion and the vertical portion may extend around at least a part of a light transmitting region included in the unit region.

The protrusion may include a first lateral surface obliquely tilted with respect to a bottom surface of the protrusion.

The unit region may include a plurality of subregions at which the liquid crystal molecules are tilted in different directions from each other when an electric field is generated in the liquid crystal layer, and the liquid crystal molecules disposed on the first lateral surface may have a pretilt in a direction to which the liquid crystal molecules are to be tilted in each of the subregions.

The first lateral surface and the bottom surface of the protrusion may form an angle in a range of about 40° to about 50°.

The protrusion may be included in a light blocking region having lower light transmittance than the light transmitting region.

The unit electrode portion may include a stem disposed at a boundary between adjacent ones of the subregions and a plurality of branches connected to the stem, and the branches may be extended toward a different direction from the first and second directions.

The unit electrode portion may include at least one planar portion disposed in at least one corner of the unit electrode portion.

The planar portion may include a second oblique side extended toward an oblique direction with respect to the first direction, and the second oblique side may be disposed internally in the subregions.

The first oblique side may overlap the planar portion.

The second oblique side may be spaced apart from the branches facing the second oblique side.

Sides of end portions of the branches may overlap the protrusion.

The first lateral surface and the bottom surface of the protrusion may form an angle in a range of about 1° to about 2°.

An occupied area of the corner portion within one corresponding subregion is equal to or less than about 50%.

The corner portion may be included in the light transmitting region.

A maximum thickness of the corner portion is equal to or less than about 0.5 μm.

The display device may further include a second substrate facing the first substrate with the liquid crystal layer interposed between the first substrate and the second substrate, and a spacer disposed on the first substrate, while the protrusion and the spacer may be disposed in a same layer and may include a same material.

Further, the display device may include a main light blocker disposed in the same layer as the spacer and the protrusion, including the same material as the spacer and the protrusion, having a thickness of less than a thickness of the spacer, and the main light blocker may be disposed in a light blocking region.

The first oblique side may be connected to a side of the horizontal portion or the vertical portion.

The display device may include a pixel configured to display an image in correspondence to one image signal, and the pixel may include a plurality of unit regions.

Another embodiment of the present disclosure provides a display device including: a first substrate including a plurality of unit regions; a unit electrode portion disposed on the first substrate and disposed in one unit region of the plurality of unit regions; an opposed electrode facing the unit electrode portion; and a liquid crystal layer including a plurality of liquid crystal molecules interposed between the unit electrode portion and the opposed electrode, wherein the unit region includes a plurality of subregions at which the liquid crystal molecules are tilted in different directions from each other when an electric field is generated in the liquid crystal layer, and the unit electrode portion includes a stem disposed at a boundary between adjacent subregions, a plurality of branches connected to the stem, and at least one planar portion disposed in at least one corner of the unit electrode portion.

The planar portion may include an oblique side extended toward an oblique direction with respect to an extended direction of the stem, and the oblique side may be disposed internally in the subregions.

The oblique side may be spaced apart from the branches facing the oblique side.

A ratio of an occupied area of the planar portion in a corresponding subregion may be equal to or less than about 50%.

According to an exemplary embodiment of the present disclosure, a display device may improve liquid crystal alignment controllability and transmittance thereof.

DETAILED DESCRIPTION OF THE EMBODIMENTS

Figure 1:
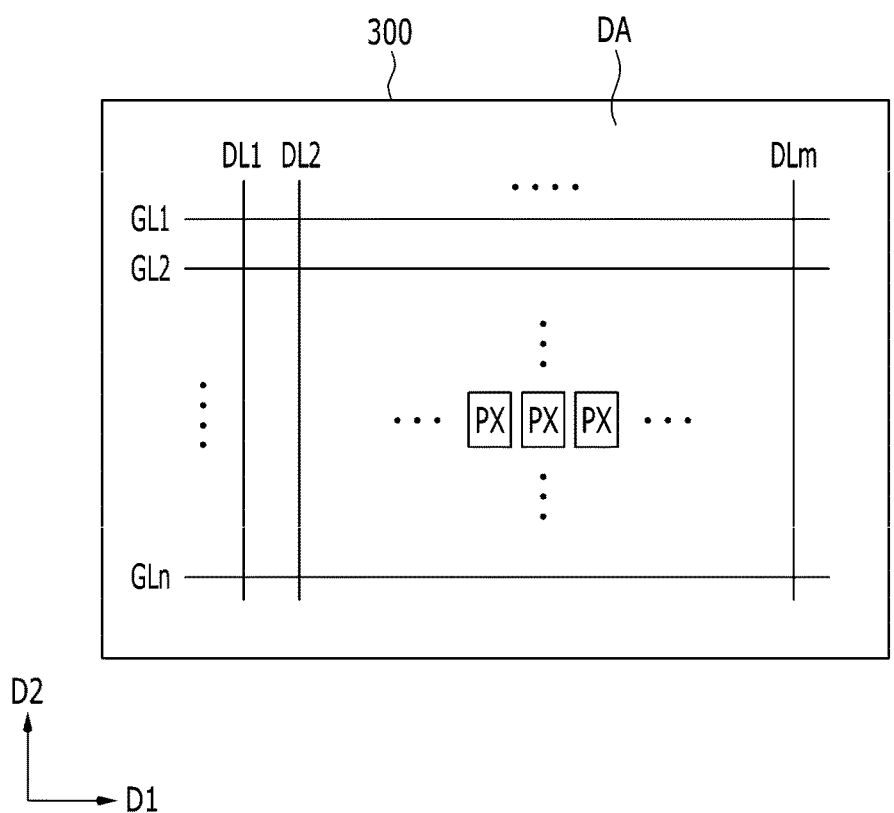
FIG. 1 is a layout view of a display device according to an exemplary embodiment of the present disclosure.

The present system and method are described more fully hereinafter with reference to the accompanying drawings in which exemplary embodiments of the present system and method are shown. As those skilled in the art would realize, the described embodiments may be modified in various different ways, all without departing from the spirit or scope of the present disclosure.

In the drawings, the thicknesses of layers, films, panels, regions, etc., are exaggerated for clarity. Like reference numerals designate like elements throughout the specification. When an element such as a layer, film, region, or substrate is referred to as being "on" another element, it may be directly on the other element, or intervening elements may also be present. In contrast, when an element is referred to as being "directly on" another element, there are no intervening elements present.

To avoid diluting the relevant subject matter, parts that are generally known to those of ordinary skill in the art may be omitted from the description herein, and like numerals refer to like or similar constituent elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" imply the inclusion of stated elements but not the exclusion of any other elements.

First, a display device according to an exemplary embodiment of the present disclosure is described with reference to FIG. 1 to FIG. 3.

Referring to FIG. 1, the display device according to the exemplary embodiment of the present disclosure includes a display panel 300. The display panel 300 includes a display area DA in which a plurality of pixels PX are arranged, and a plurality of signal lines are disposed in the display area DA. A plurality of pixels PX may be arranged substantially in a matrix form, but they are not limited thereto.

The pixels PX are disposed in the display area of the display panel 300 to display an image according to an image signal, and may display a primary color, such as red, green, blue, or the like. Various colors may be displayed by adjusting the luminance of a plurality of pixels PX having different colors.

One pixel PX may include at least one light transmitting area having relatively high light transmittance and at least one light blocking area having no or relatively low light transmittance.

The signal line includes a plurality of gate lines GL1-GLn for transferring a gate signal to control turn on and off of a switching element and a plurality of data lines DL1-DLm for transferring a data voltage. The gate lines GL1-GLn are extended to a first direction D1, and the data lines DL1-DLm are extended to a second direction D2 that is different from the first direction D1. The second direction D2 may be perpendicular to the first direction D1, and the first direction D1 and the second direction D2 are on the same plane when the display panel 300 is viewed from a vertical direction with respect to a plane of the display panel 300.

The display panel 300 may include at least one switching element disposed in an area corresponding to one pixel PX and at least one pixel electrode connected thereto. The switching element may include at least one thin film transistor connected to at least one data line DLj (j=1, 2, . . . , or m) and at least one gate line GLi (i=1, 2, . . . , or n). The thin film transistor may transfer a data voltage to the pixel electrode through the data line DLj controlled according to a gate signal transferred through the gate line GLi.

In view of a cross-sectional structure, the display panel 300 of the liquid crystal display includes at least one liquid crystal layer, and the liquid crystal layer includes a plurality of liquid crystal molecules. The liquid crystal molecules may be initially aligned in a substantially vertical direction with respect to the plane of the display panel 300. To that end, the display panel 300 may include at least one vertical alignment layer adjacent to the liquid crystal layer. Herein, the plane of the display panel 300 designates a plane extended in a direction parallel to the first and second directions D1 and D2.

Figure 2:
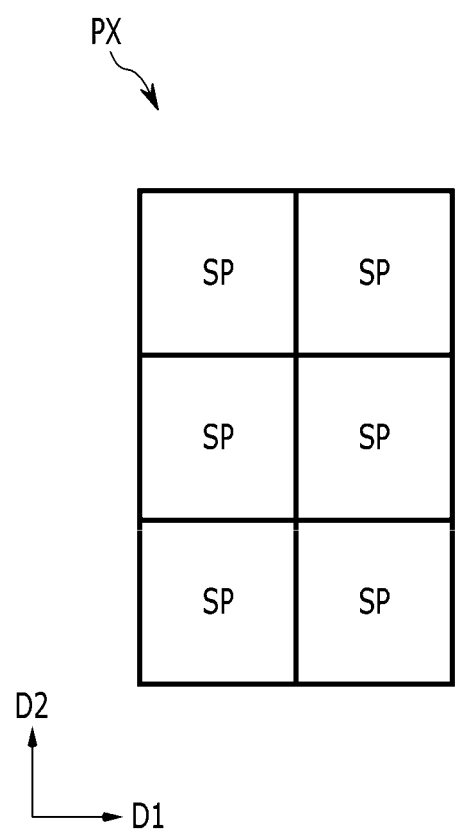
FIG. 2 and FIG. 3 are top plan views illustrating a plurality of unit regions in a pixel of a display device according to an exemplary embodiment of the present disclosure.
Figure 3:
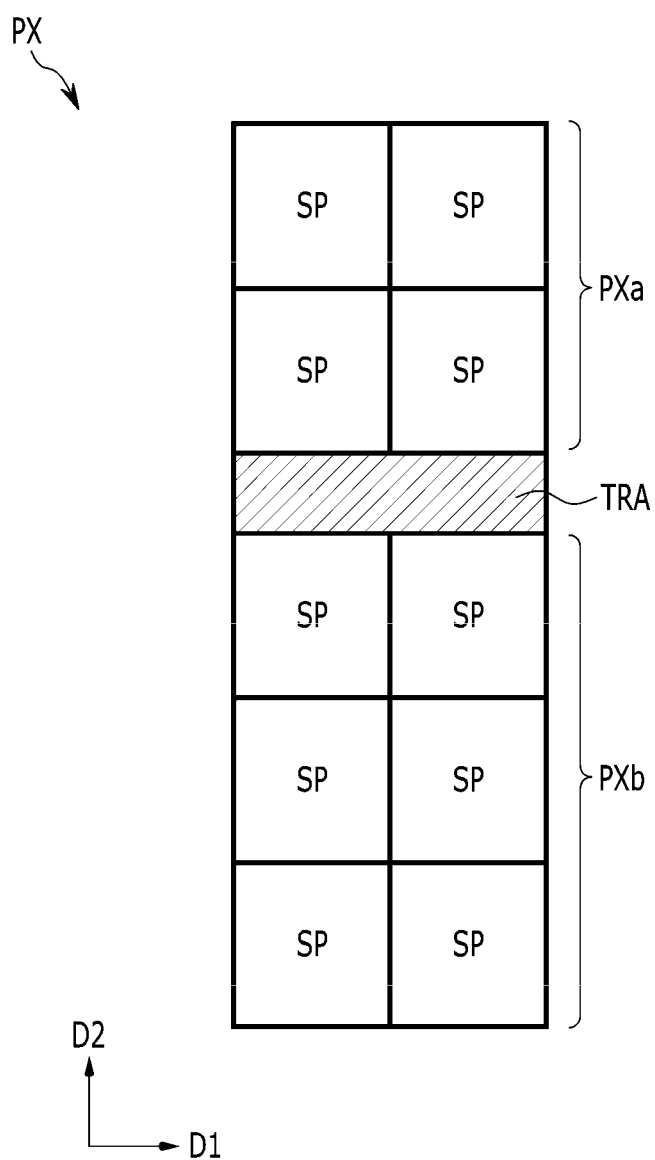

Referring to FIG. 2 and FIG. 3, one pixel PX includes at least one unit region SP. Particularly, in the case in which one pixel PX includes a plurality of unit regions SP, the unit region SP may have a uniform or non-uniform area.

In the case in which one pixel PX includes a plurality of unit regions SP, the unit regions SP included in one pixel PX may be arranged in a quadrangular matrix form as illustrated in FIG. 2. FIG. 2 illustrates an example in which one pixel PX includes six unit regions SP arranged in a 3×2 matrix form, but this exemplary embodiment of the present disclosure is not limited thereto.

A plurality of unit regions SP included in one pixel PX may be configured in two separated regions interposing a thin film transistor region TRA including a thin film transistor therebetween as illustrated in FIG. 3. For example, a plurality of unit regions SP arranged in a 2×2 matrix form may be disposed in an upper part with respect to the thin film transistor region TRA and a plurality of unit regions SP arranged in a 3×2 matrix form may be disposed in a lower part with respect to the thin film transistor region TRA, but the present exemplary embodiment is not limited thereto.

The thin film transistor region TRA may correspond to a light blocking region through which little or no light is transmitted. Most portions of the unit region SP may serve as a light transmitting region.

One pixel PX of the display device according to the exemplary embodiment of the present disclosure may include a plurality of subpixels PXa and PXb for displaying an image of a luminance depending on identical or different gamma curves corresponding to an image signal. Referring to FIG. 3, the first subpixel PXa included in one pixel PX may include a plurality of unit regions SP at one side with respect to the thin film transistor region TRA, and the second subpixel PXb included in one pixel PX may include a plurality of unit regions SP at an opposite side with respect to the thin film transistor region TRA. In a medium gray, a number of the unit regions SP included in the second subpixel PXb may be more than a number of the unit regions SP included in the first subpixel PXa when the second subpixel PXb displays an image having lower luminance than that of the first subpixel PXa.

Next, a specific structure of the unit region SP of a display device according to an exemplary embodiment of the present disclosure is described with reference to FIG. 4 and FIG. 5 along with above-described FIG. 1 to FIG. 3.

Figure 4:
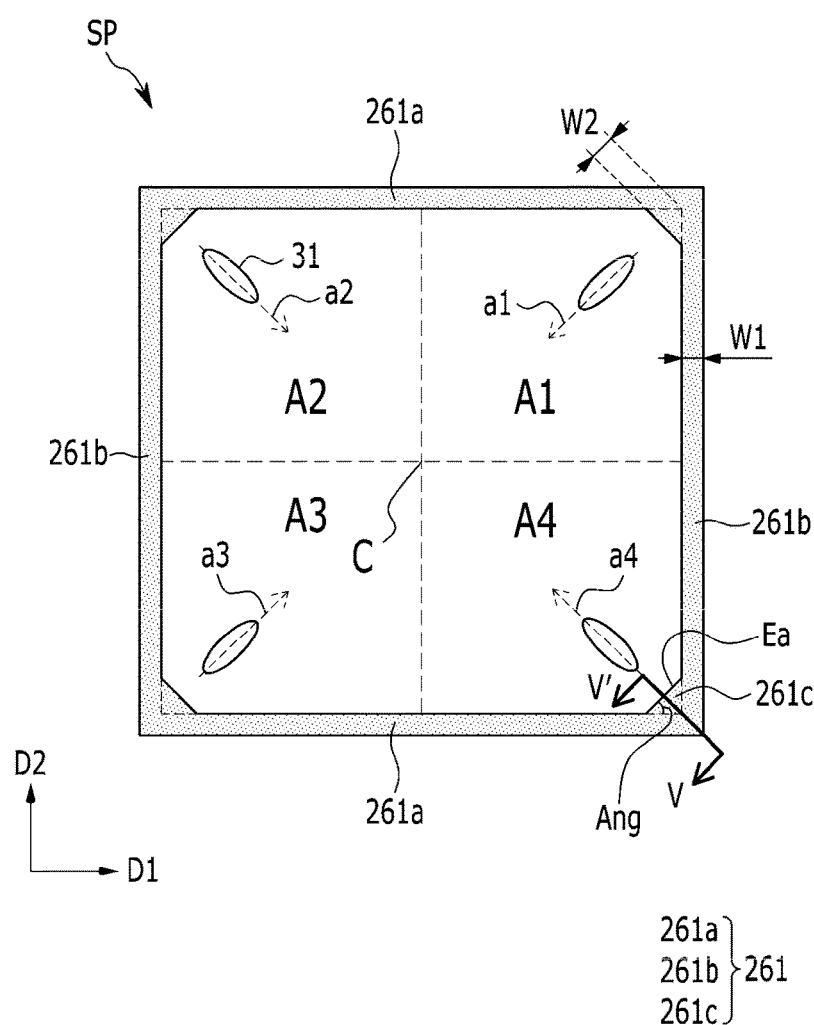
FIG. 4 is a top plan view illustrating a protrusion and an alignment direction of liquid crystal molecules in a unit region of a display device according to an exemplary embodiment of the present disclosure.

Referring to FIG. 4, one unit region SP includes a plurality of subregions A1, A2, A3, and A4, when viewed in a planar structure. Liquid crystal molecules 31 included in each of subregions A1, A2, A3, and A4 are realigned such that the directions of their major axes are respectively different from each other when an electric field is generated in the liquid crystal layer. The major axes of the liquid crystal molecules 31 are initially aligned to be perpendicular with respect to a plane of the display panel 300, and are tilted and realigned in a direction parallel to a plane of the display panel 300 according to the generated electric field.

For example, as illustrated in FIG. 4, in the case in which one unit region SP includes four subregions A1, A2, A3, and A4, the liquid crystal molecules 31 disposed in each of subregions A1, A2, A3, and A4 are tilted in respectively different directions a1, a2, a3, and a4. The directions a1, a2, a3, and a4 in which the liquid crystal molecules 31 are mainly tilted are different from the first and second directions D1 and D2. For example, the tilting directions a1, a2, a3, and a4 of the liquid crystal molecules 31 in each of subregions A1, A2, A3, and A4 may be in a range of about 40° to about 50° or about 130° to about 140° with respect to the first direction D1 or the second direction D2, but they are not limited thereto. The tilting direction a1 of the liquid crystal molecules 31 in the first subregion A1 is opposite to the tilting direction a3 of the liquid crystal molecules 31 in the third subregion A3, and the tilting direction a2 of the liquid crystal molecules 31 in the second subregion A2 is opposite to the tilting direction a4 of the liquid crystal molecules 31 in the fourth subregion A4. Vector components in the first direction D1 of the tilting directions a1, a2, a3, and a4 of the liquid crystal molecules 31 in a pair of subregions of A1, A2, A3, and A4 that are adjacent to each other along the first direction D1 or the second direction D2 may be opposite to each other. Further, the tilting directions a1, a2, a3, and a4 of the pair of adjacent subregions of A1, A2, A3, and A4 along the first direction D1 or the second direction D2 may form an angle in a range of 85° to 95°, but they are not limited thereto.

Most regions of the subregions A1, A2, A3, and A4 serve as light transmitting regions.

Figure 5:
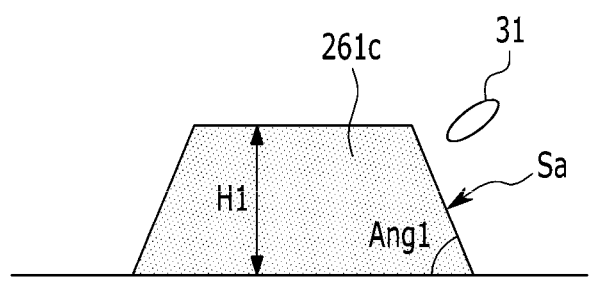
FIG. 5 is an exemplary cross-sectional view of FIG. 4 taken along the line V-V'.

Referring to FIG. 4 and FIG. 5, one unit region SP includes a protrusion 261 for controlling an alignment direction of the liquid crystal molecules 31. The pixel PX (not shown) may include the pixel electrode that is one of electrodes for generating an electric field in the liquid crystal layer, and the protrusion 261 may be interposed between the pixel electrode and the liquid crystal layer. The protrusion 261, as illustrated in FIG. 5, may provide a pretilt to the liquid crystal molecules 31 by protruding toward the liquid crystal layer, thereby controlling the tilting direction of the liquid crystal molecules 31. A cross-sectional position of the protrusion 261 may be disposed on another layer having a surface that is formed to protrude toward the liquid crystal layer.

Referring to FIG. 4, when viewed from a planar structure, the protrusion 261 includes a pair of horizontal portions 261a configured to face each other with respect to a center C of the unit region SP and each including a side parallel to the first direction D1, a pair of vertical portions 261b configured to face each other with respect to the center C of the unit region SP and each including a side parallel to the second direction D2, and a corner portion 261c including an oblique side Ea parallel to a direction oblique to the first and second directions D1 and D2.

The horizontal portion 261a and the vertical portion 261b that are adjacent to each other may be connected to each other as illustrated in FIG. 4, or may be spaced apart from each other. A width of the horizontal portion 261a and a width of the vertical portion 261b may be the same or may be different from each other.

The corner portion 261c is interposed between the horizontal portion 261a and the vertical portion 261b that are adjacent to each other. The corner portion 261c may be in a shape of substantially a triangle including the oblique side Ea. The other two sides of the corner portion 261c except for the oblique side Ea may be substantially parallel to the first and second directions D1 and D2, respectively. The oblique side Ea of the corner portion 261c, as illustrated in FIG. 4, may be connected to adjacent sides of the horizontal portion 261a and the vertical portion 261b, or spaced apart therefrom with a predetermined distance therebetween.

The pair of horizontal portions 261a, the pair of vertical portions 261b, and the four corner portions 261c may be connected to each other to substantially constitute a closed curve. In this case, the protrusion 261 may have a substantially quadrangular shape.

The oblique side Ea of the corner portion 261c may form an angle Ang with the first direction D1 to be greater than about 40° and less than about 90°. Herein, the angle Ang is an acute angle. An extending direction of the oblique side Ea may cross the tilting directions a1, a2, a3, and a4 of the liquid crystal molecules 31 in subregions A1, A2, A3, and A4, respectively. More specifically, an angle of the crossing may be substantially 90°.

A distance W2 between the oblique side Ea of the corner portion 261c and a vertex formed to face the oblique side Ea may be equal to or less than a width W1 of the horizontal portion 261a or the vertical portion 261b, but is not limited thereto.

The protrusion 261 is formed around at least a part of the light transmitting region of the unit region SP. FIG. 4 illustrates an example in which the protrusion 261 forms a closed curve surrounding a plurality of subregions A1, A2, A3, and A4 included in the unit region SP. The protrusion 261 may correspond to a light blocking region surrounding the light transmitting region, but is not limited thereto.

Referring to FIG. 4 and FIG. 5, the protrusion 261 includes a lateral surface Sa that serves as a slope obliquely tilted with respect to a bottom surface of the protrusion 261 when viewed from a cross-sectional structure. A cross-sectional angle Ang1 between the lateral surface Sa and the bottom surface of the protrusion 261 may be in a range of about 40° to about 50°, but is not limited thereto, and may vary depending on a material characteristic or a manufacturing process of the protrusion 261.

The protrusion 261 may include a pair of lateral surfaces Sa configured to face each other, and a top side therebetween may be substantially parallel to the bottom surface of the protrusion 261. However, in some cases, the top side of the protrusion 261 substantially parallel to the bottom surface thereof may be omitted.

A maximum height H1 of the protrusion 261 from the bottom surface thereof, i.e., the maximum thickness may be in a range of about 0.5 μm to about 1.2 μm, but is not limited thereto, and may vary depending on a design condition.

The oblique side Ea of the corner portion 261c corresponds to a bottom side of the lateral surface Sa of the corner portion 261c.

A vertical alignment layer may be disposed on a surface of the protrusion 261. Accordingly, the liquid crystal molecules 31 around the surface of the protrusion 261 may be aligned in a substantially perpendicular direction to the surface of the protrusion 261.

When the alignment of the liquid crystal molecules 31 substantially perpendicular to a plane of the display panel 300 is determined as a reference alignment, the protrusion 261 controls the liquid crystal molecules 31, particularly those adjacent to the lateral surface Sa, to have a pretilt toward each interior portion of the subregions A1, A2, A3, and A4 even when an electric field is not generated in the liquid crystal layer. A pretilt direction forms an acute angle together with a direction of the reference alignment substantially vertical to the plane of the display panel 300, and the acute angle therebetween may be greater than about 30°.

Particularly, the corner portion 261c of the protrusion 261 controls the liquid crystal molecules 31 adjacent thereto to have the pretilt toward the tilting directions a1, a2, a3, and a4.

Such pretilt of the liquid crystal molecules 31 by the protrusion 261 may provide faster alignment of the liquid crystal molecules 31 disposed in each of the subregions A1, A2, A3, and A4 in respective tilting directions a1, a2, a3, and a4 when an electric field is generated in the liquid crystal layer.

Particularly, since the direction perpendicular to the oblique side Ea of the corner portion 261c substantially faces the center C of the unit region SP, the liquid crystal molecules 31 positioned around the corner portion 261c already have a pretilt in the tilting directions a1, a2, a3, and a4 in which the liquid crystal molecules 31 are tilted when an electric field is generated in the liquid crystal layer. Accordingly, the liquid crystal molecules 31 may be realigned faster in the tilting directions a1, a2, a3, and a4, thereby improving the response speed and transmittance thereof.

In the case in which the angle Ang is about 45°, the corner portion 261c may control the liquid crystal molecules 31 disposed in the subregions A1, A2, A3, and A4 to be aligned faster in a direction toward the center C thereof. In the case in which the angle Ang is greater than about 45°, the corner portion 261c may control the liquid crystal molecules 31 to have an angle that is less than about 45° between the tilting directions a1, a2, a3, and a4 thereof and the first direction D1. In this case, the liquid crystal molecules 31 may be tilted in a direction closer to the first direction D1 than the second direction D2 when an electric field is generated in the liquid crystal layer. Accordingly, side visibility may be improved.

If the liquid crystal layer of the display panel 300 is pressed by an external pressure, and thus an alignment of the liquid crystal molecules 31 is in disorder, even though the external pressure is removed, the alignment of the liquid crystal molecules 31 may not be recovered, thereby being seen as spots. However, according to the exemplary embodiment of the present disclosure, the protrusion 261 may control the alignment of the liquid crystal molecules 31 that are adjacent thereto in a predetermined direction. This facilitates the recovery of the liquid crystal molecules 31 in each of the subregions A1, A2, A3, and A4 to the original alignment direction. That is, after an external pressure is removed, the recovery speed at which the alignment of the liquid crystal molecules 31 returns from disorder is improved. Particularly, the corner portion 261c of the protrusion 261 may support faster recovery to the tilting directions a1, a2, a3, and a4.

As such, according to the exemplary embodiment of the present disclosure, when an image is displayed by generating an electric field in the liquid crystal layer, the liquid crystal molecules 31 may be realigned faster in a target alignment direction due to the protrusion 261, so the transmittance may be further improved, and an image closer to a target luminance may be displayed, thereby improving the display quality.

According to an exemplary embodiment of the present disclosure, the protrusion 261 may include an organic material. In a manufacturing process of the display device according to an exemplary embodiment of the present disclosure, the protrusion 261 may be formed by coating an organic material and then using a photolithographic process with exposure using a photomask and development. In this case, light transmittance of the photomask corresponding to the protrusion 261 may have a constant value.

A detailed structure of a unit region SP of a display device according to an exemplary embodiment of the present disclosure is described with reference to FIG. 6 to FIG. 12, as well as above-described FIG. 1 to FIG. 5. The same constituent elements as in the above-described exemplary embodiments are designated by the same reference numerals, and descriptions thereof are omitted. While focusing on different elements, detailed descriptions are provided.

Figure 6:
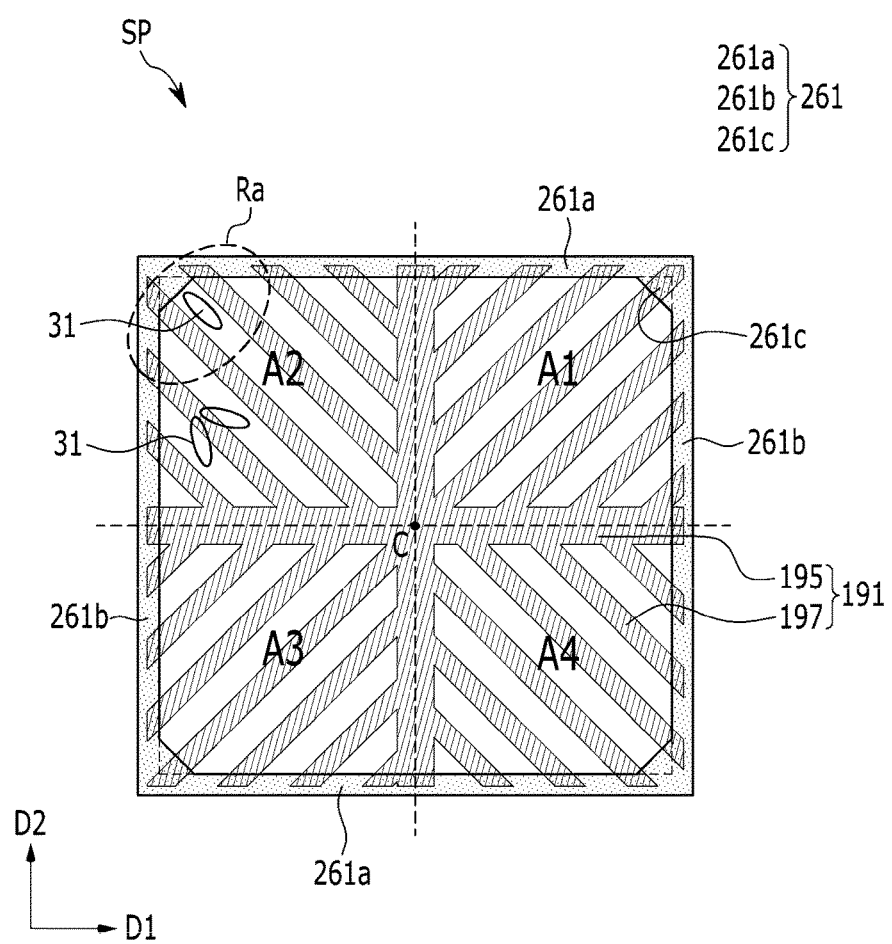
FIGS. 6, 7, 8, 9, 10, 11, 12 and 13 are top plan views illustrating a structure of a protrusion and a unit electrode portion in a unit region of a display device according to an exemplary embodiment of the present disclosure.

First, referring to FIG. 6, a display device according to the present exemplary embodiment is substantially the same as aforementioned exemplary embodiments, while a structure of the pixel electrode is more specified in this exemplary embodiment.

Referring to FIG. 6, a unit electrode portion 191 is disposed in one unit region SP. In the case in which one pixel PX includes a plurality of unit regions SP, the unit electrode portion 191 may be a part of a pixel electrode disposed in the pixel PX, and in the case in which one pixel PX includes one unit region SP, the unit electrode portion 191 may be a pixel electrode itself.

An overall shape of the unit electrode portion 191 is substantially a quadrangle, and includes a cross-shaped stem 195 including a horizontal stem and a vertical stem intersecting the horizontal stem, and a plurality of branches 197. A center of the cross-shaped stem 195 may substantially coincide with the center C of the unit region SP.

The cross-shaped stem 195 is extended along a boundary between the subregions A1, A2, A3, and A4 of the unit region SP. In other words, the unit region SP is divided into the subregions A1, A2, A3, and A4 by the cross-shaped stem 195. The horizontal stem of the cross-shaped stem 195 may extend in a direction parallel to the first direction D1, and the vertical stem thereof may extend in a direction parallel to the second direction D2.

A width of the cross-shaped stem 195 may be in a range of about 4 μm to about 6 μm, but is not limited thereto.

The branches 197 are connected to the cross-shaped stem 195 and extend outward from the cross-shaped stem 195. The branches 197 are disposed in the subregions A1, A2, A3, and A4, and a slit excluding an electrode is disposed between adjacent branches 197 disposed in each of the subregions A1, A2, A3, and A4. Intersecting positions of the branches 197 of a pair of subregions of A1, A2, A3, and A4 adjacent to each other along the first direction D1 or the second direction D2 with the cross-shaped stem 195 may not be disposed coincidently, but may be disposed alternately.

Pitches of the branches 197 and the slit may be in a range of about 5 μm to about 8 μm, but are not limited thereto. Further, a ratio of widths of the branches 197 and the slit may be in a range of about 1.5:1 to about 1:1.5, but is not limited thereto, and may be appropriately adjusted in consideration of a display characteristic.

Among the four subregions A1, A2, A3, and A4 of the unit region SP, the branches 197 disposed in the first subregion A1 obliquely extend toward the upper right direction from the cross-shaped stem 195, the branches 197 disposed in the second subregion A2 obliquely extend toward the upper left direction from the cross-shaped stem 195, the branches 197 disposed in the third subregion A3 obliquely extend toward the lower left direction from the cross-shaped stem 195, and the branches 197 disposed in the fourth subregion A4 obliquely extend toward the lower right direction from the cross-shaped stem 195.

Although not illustrated, at least some of end portions of the branches 197 may be connected to each other to form an outer circumference of the unit electrode portion 191.

An acute angle between the branches 197 and an extending direction of the horizontal stem of the cross-shaped stem 195 may be in a range of 40° to about 50°, but is not limited thereto, and may be appropriately adjusted in consideration of a display characteristic such as visibility of the display device.

According to the exemplary embodiment of the present disclosure, the unit region SP may include the above-described protrusion 261, and the protrusion 261 may be disposed above or below the unit electrode portion 191. Hereinafter, an example in which the protrusion 261 is disposed on the unit electrode portion 191 is mainly described.

The sides of end portions of the branches 197 may or may not overlap the protrusion 261. FIG. 6 illustrates an example in which a side of an end portion of the branches 197 overlaps the protrusion 261. In this case, efficiency of a light transmitting region of the unit region SP may be improved.

The display panel 300 may further include an opposed electrode (not illustrated in FIG. 6) configured to face the unit electrode portion 191 interposing the liquid crystal layer therebetween. The opposed electrode serves as a field generating electrode generating an electric field in the liquid crystal layer together with the pixel electrode. A voltage difference between a data voltage applied to the pixel electrode and a voltage applied to the opposed electrode may vary depending on a gray of an image signal corresponding to the pixel PX. Opposed electrodes disposed in a plurality of pixels PX of the display panel 300 may be connected to each other to transfer the same voltage. The opposed electrodes may be formed in a shape of a unitary plate without any cutout.

Hereinafter, a display operation of the display device according to an exemplary embodiment of the present disclosure is described.

When a thin film transistor connected to the pixel electrode including the unit electrode portion 191 is turned on, a data voltage is applied to the pixel electrode. Then, the opposed electrode to which a constant voltage, such as a common voltage, is applied generates an electric field in the liquid crystal layer together with the pixel electrode. The electric field includes a perpendicular component substantially perpendicular to a plane of the display panel 300, and the liquid crystal molecules 31 tend to be tilted in a substantially parallel direction to the plane of the display panel 300 by the perpendicular component of the electric field. In this case, edges of the branches 197 of the unit electrode portion 191 may generate a fringe field. The liquid crystal molecules 31 around the branches 197 are tilted by this fringe field toward insides of the branches 197. As a result, the liquid crystal molecules 31 are tilted mostly to the center C and are tilted to a direction substantially parallel to an extending direction of the branches 197. Accordingly, tilting directions of the liquid crystal molecules 31 in four subregions A1, A2, A3, and A4 are different from each other, and may be the same as the above-described tilting directions a1, a2, a3, and a4 of the liquid crystal molecules 31 illustrated in FIG. 4.

As described above, the protrusion 261 may improve controllability for realigning the liquid crystal molecules 31 (referred to as liquid crystal alignment controllability) and response speed by providing the pretilt to the liquid crystal molecules 31. Particularly, the corner portion 261c of the protrusion 261 may further improve the liquid crystal alignment controllability and the response speed of the liquid crystal molecules 31 by providing the pretilt close to the tilting directions a1, a2, a3, and a4 of the liquid crystal molecules 31 as in a region Ra illustrated in FIG. 6.

Other effects of the protrusion 261 are the same as those of the aforementioned descriptions.

According to the exemplary embodiment of the present disclosure, sufficient controllability of the liquid crystal molecules 31 may be secured without including an alignment aid to an alignment layer or a liquid crystal layer, unlike a conventional art. Accordingly, a display device having improvements in liquid crystal alignment controllability and transmittance may be provided without adding a complex manufacturing process for forming an alignment aid.

Further, liquid crystal alignment controllability of the liquid crystal molecules 31 may be improved without deterioration of transmittance when one pixel PX includes a plurality of unit regions SP and a size of the pixel PX is increased.

Figure 7:
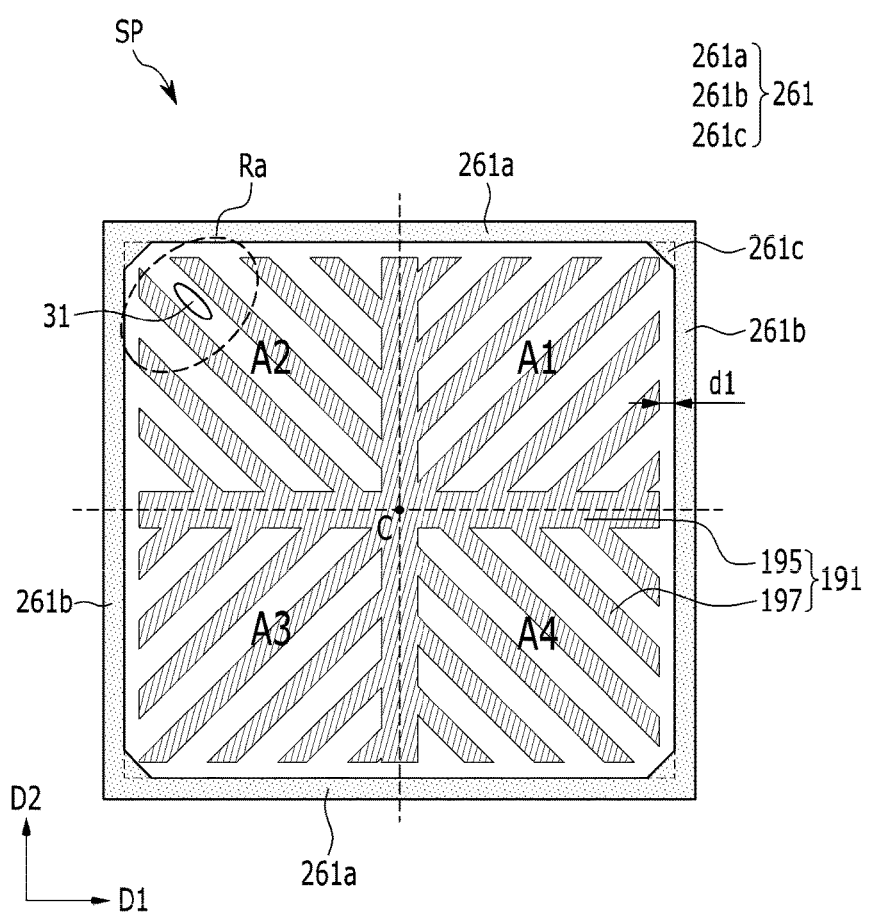

Next, referring to FIG. 7, a display device according to the present exemplary embodiment is the same as most of the aforementioned exemplary embodiment illustrated in FIG. 6, while sides of end portions of the branches 197 of the unit electrode portion 191 may not be overlapped with the protrusion 261. A distance d1 between the sides of end portions of the branches 197 and a side of an inner edge of the protrusion 261 may be equal to or greater than 0 μm and may be equal to or less than about 1 μm.

According to the present exemplary embodiment, the display device may have improved side visibility.

Figure 8:
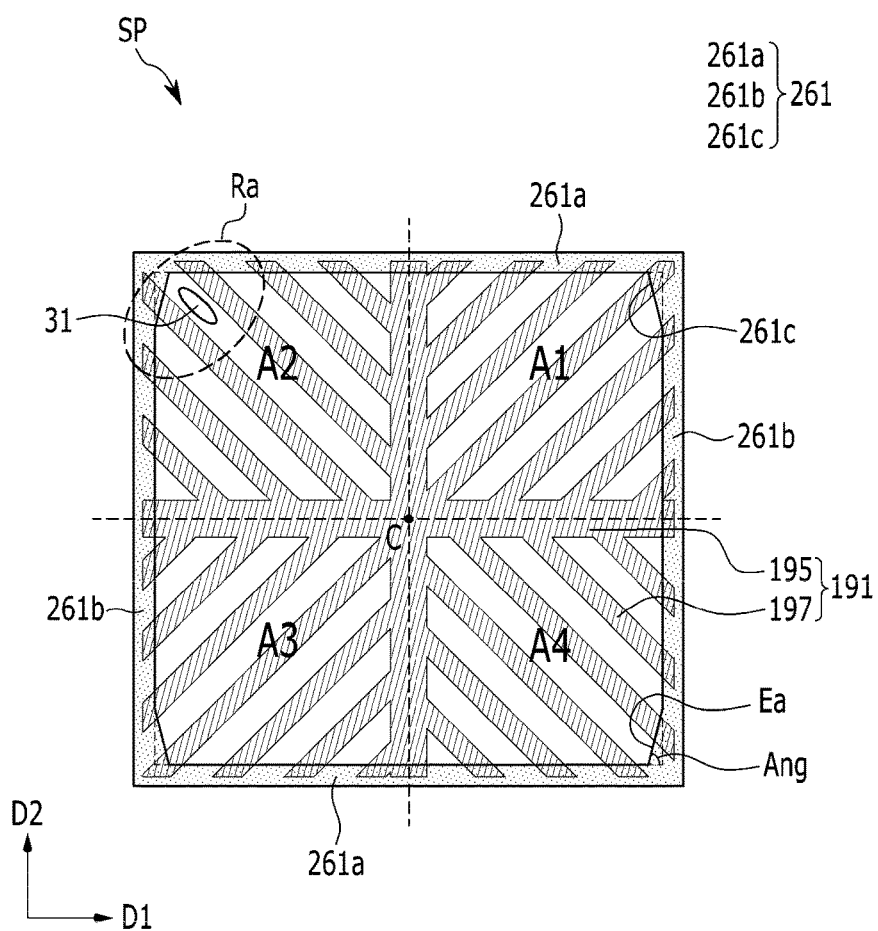

Next, referring to FIG. 8, a display device according to the present exemplary embodiment is the same as most of the aforementioned exemplary embodiment illustrated in FIG. 6, while the oblique side Ea of the corner portion 261c of the protrusion 261 and the first direction D1 may form the angle Ang to be greater than about 45°. In this case, the tilting directions a1, a2, a3, and a4 of the liquid crystal molecules 31 by the corner portion 261c and the first direction D1 may be controlled to form an angle therebetween of less than about 45°. As a result, when an electric field is generated in the liquid crystal layer, the liquid crystal molecules 31 may be tilted in a direction closer to the first direction D1 than the second direction D2, so the side visibility may be improved.

Figure 9:
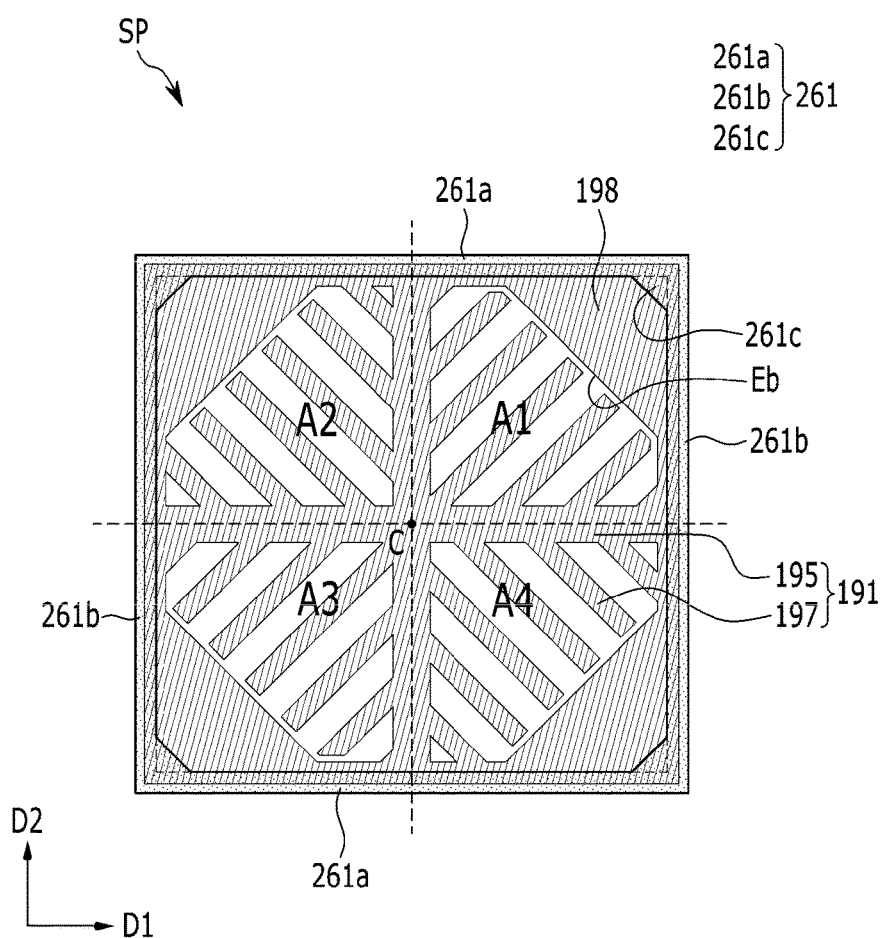

Next, referring to FIG. 9, a display device according to the present exemplary embodiment is the same as most of the aforementioned exemplary embodiment, while the unit electrode portion 191 may have a different structure.

The unit electrode portion 191 is the same as most of the unit electrode portion 191 of the aforementioned exemplary embodiment, while at least one planar portion 198 in a shape of a unitary plate may be disposed in at least one of four corners thereof. In the case in which the unit electrode portion 191 is of a substantially quadrangle shape, at least one planar portion 198 is disposed in at least one corner of the quadrangle. FIG. 9 illustrates an example in which each planar portion 198 is disposed in four corners of the unit electrode portion 191.

An electrode forming the planar portion 198 has no pattern thereon, so has a continuous surface without an opening such as a slit.

One planar portion 198 may be a polygon, for example, a triangle, including an oblique side Eb disposed at an interior of one of the subregions A1, A2, A3, and A4. The planar portion 198 may be of a triangle shape including a first vertex corresponding to a vertex of the unit electrode portion 191 and formed to face the oblique side Eb, a second vertex formed on a horizontal side of the unit electrode portion 191, and a third vertex formed on a vertical side of the unit electrode portion 191. The oblique side Eb extends toward a direction crossing an extending direction of the branches 197 of each of the subregions A1, A2, A3, and A4. More specifically, a direction in which the oblique side Eb extends may be mostly perpendicular to the extending direction of the branches 197. The planar portion 198 may form an outer circumference of the unit electrode portion 191 and may include two sides connected to the oblique side Eb.

Among the vertices of the planar portion 198, the vertex formed on the horizontal side or the vertical side of the unit electrode portion 191 is formed on the end portion of the oblique side Eb, and may be disposed between the vertex of the unit electrode portion 191 and an end portion of the vertical stem of the cross-shaped stem 195. Accordingly, an area occupied by the planar portion 198 in the subregions A1, A2, A3, and A4 may be equal to or less than about 50%. In this case, a distance between the oblique side Eb of the planar portion 198 and a vertex formed to face the oblique side Eb may be equal to or less than about 50% of a diagonal length of each of the subregions A1, A2, A3, and A4.

An angle between the oblique side Eb of the planar portion 198 and an extending direction of the horizontal stem of the cross-shaped stem 195, i.e. the first direction D1, may be in a range of about 40° to about 50°. Particularly, the oblique side Eb of the planar portion 198 may be substantially parallel to the oblique side Ea of the corner portion 261c of the protrusion 261. The oblique side Ea of the corner portion 261c of the protrusion 261 is overlapped with an interior region of the planar portion 198.

As such, in the case in which the unit electrode portion 191 includes the planar portion 198, liquid crystal alignment controllability may be improved by the action of a fringe field generated by the oblique side Eb of the planar portion 198, thereby further improving the transmittance of the display device.

Referring to FIG. 6 described above, the liquid crystal molecules 31 around edges of the branches 197 have a tendency of being aligned in a direction that faces the inside of the branches 197 instead of being aligned in the extending direction of the branches 197. Accordingly, the transmittance may be partially deteriorated around the edge of the branches 197, so a space therearound may be seen as a dark space. However, in the case in which the unit electrode portion 191 includes the planar portion 198 as in the present exemplary embodiment of the present disclosure, the dark space around the branches 197 may be reduced, so overall transmittance of the unit region SP may be improved.

Since slits or branches 197 are not formed on the planar portion 198, the controllability may not be sufficient when the liquid crystal molecules 31 are realigned. However, the planar portion 198 is disposed in a position adjacent to the corner portion 261c of the protrusion 261, and the corner portion 261c enhances the controllability of the liquid crystal molecules 31 so the alignment direction of the liquid crystal molecules 31 corresponding to the planar portion 198 may be controlled effectively. Accordingly, sufficient transmittance may be achieved.

The planar portion 198 is physically and electrically connected to the cross-shaped stem 195 with a separate connector (not illustrated). Referring to FIG. 9, the planar portion 198 may be spaced apart from the end portions of the branches 197 with a predetermined distance therebetween, but the present exemplary is not limited thereto. For example, the planar portion 198 may be connected thereto.

Figure 10:
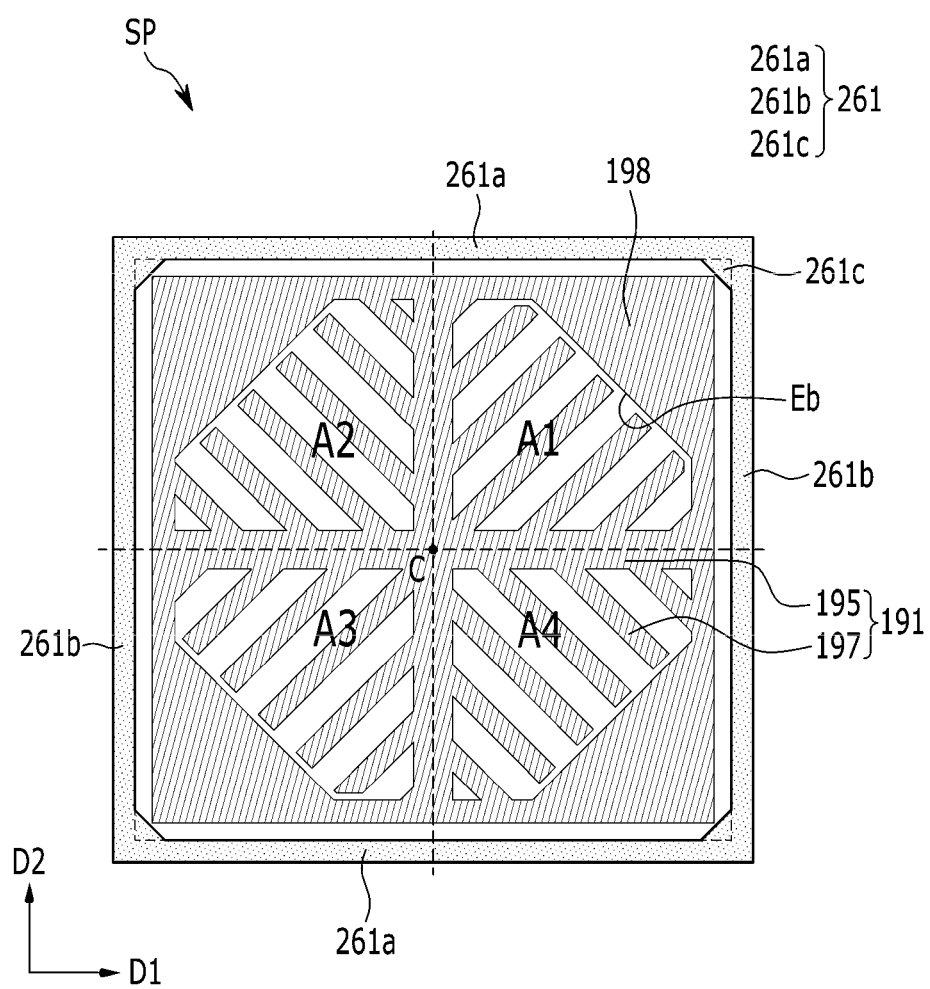

Next, referring to FIG. 10, a display device according to the present exemplary embodiment is the same as most of the aforementioned exemplary embodiment illustrated in FIG. 9, while sides of end portions of the branches 197 of the unit electrode portion 191 and an outer side of the planar portion 198 may not be overlapped with the protrusion 261. A distance between the sides of the end portions of the branches 197 and the outer side of the planar portion 198, and an inner edge of the protrusion 261, may be greater than or equal to 0 μm. According to the present exemplary embodiment, the display device may have improved side visibility.

Figure 11:
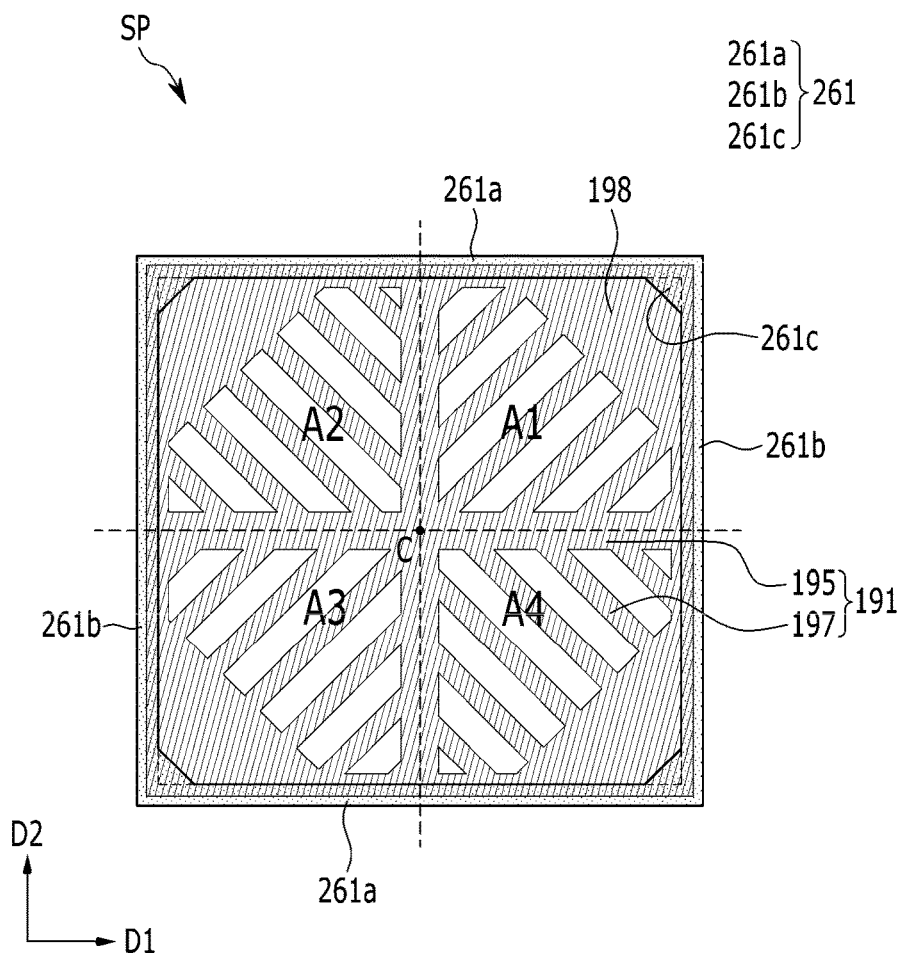

Next, referring to FIG. 11, a display device according to the present exemplary embodiment is the same as most of the aforementioned exemplary embodiment illustrated in FIG. 9, while at least one planar portion 198 of the unit region SP may be connected to end portions of the branches 197 adjacent thereto.

Figure 12:
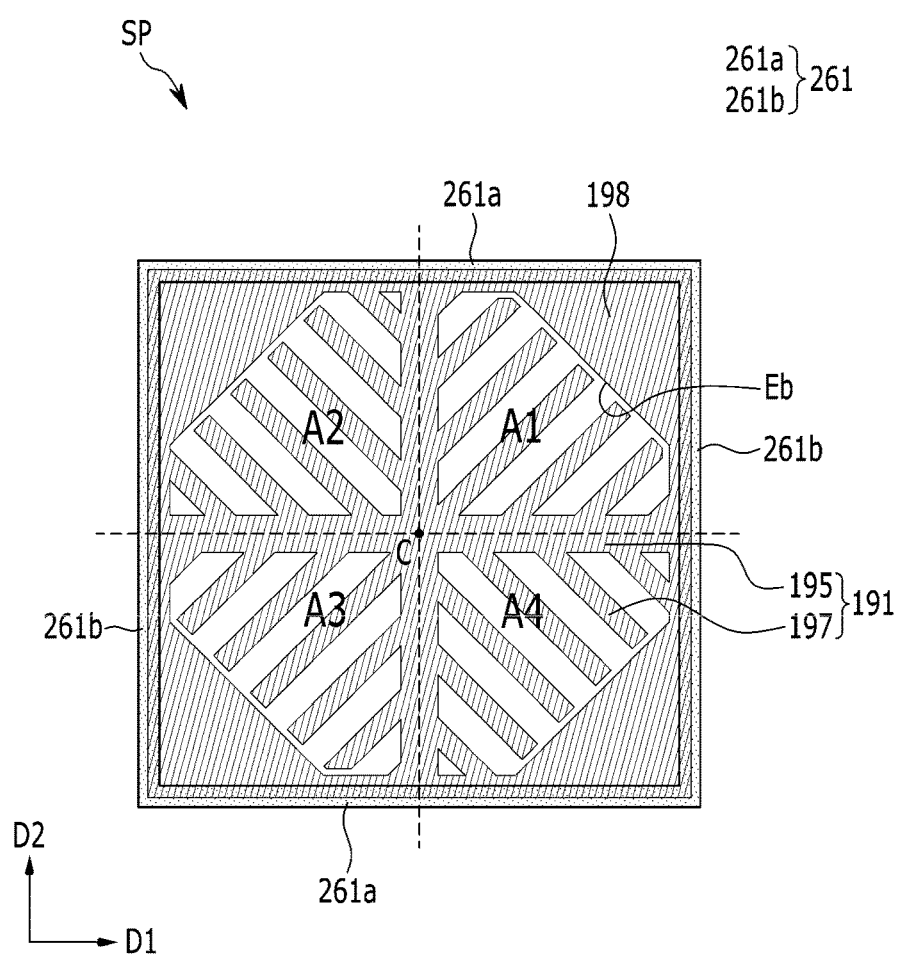

Next, referring to FIG. 12, a display device according to the present exemplary embodiment is the same as most of the aforementioned exemplary embodiment illustrated in FIG. 9, while at least one corner portion 261c of the protrusion 261 disposed in the unit region SP may be omitted. According to the present exemplary embodiment, a slit is not formed in the planar portion 198, so the above-described dark space may be reduced to improve overall transmittance.

Hereinafter, a detailed structure of the unit region SP of a display device according to an exemplary embodiment of the present disclosure is described with reference to FIG. 13 to FIG. 15 along with the above-described drawings. The same constituent elements as in the above-described exemplary embodiments are designated by the same reference numerals. Thus, descriptions thereof are omitted, and detailed descriptions focusing on different elements are provided.

Figure 13:
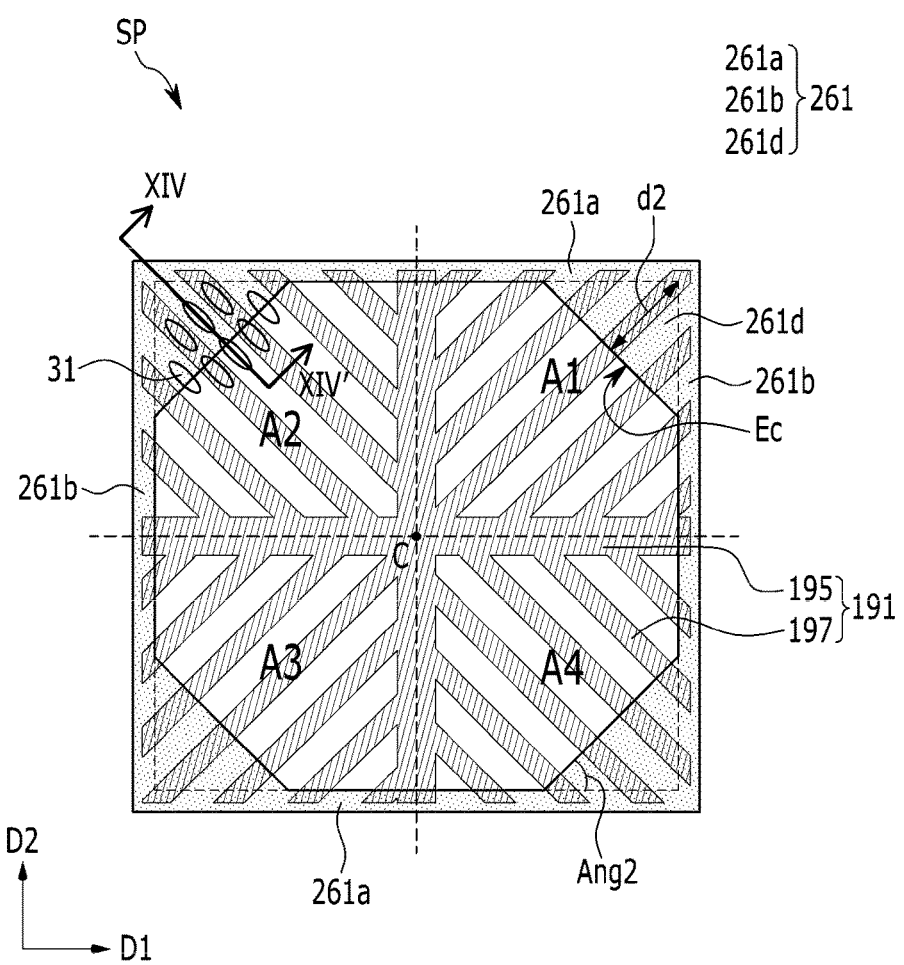
Figure 14:
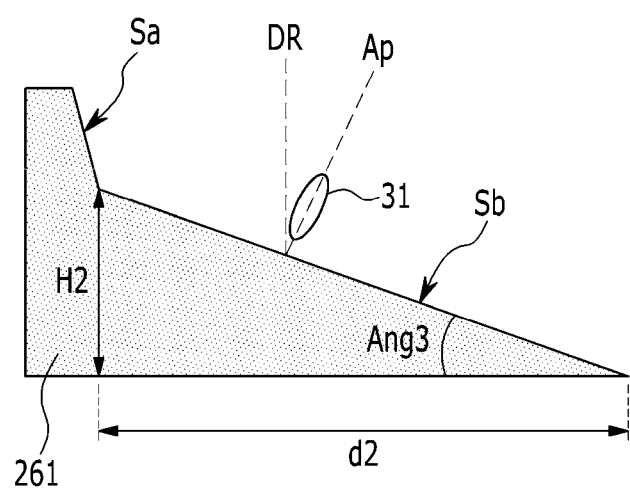
FIG. 14 is an exemplary cross-sectional view of FIG. 13 taken along the line XIV-XIV'.

Referring to FIG. 13 and FIG. 14, a display device according to the present exemplary embodiment is the same as most of the aforementioned exemplary embodiment illustrated in FIG. 6, while the protrusion 261 may have a partially different structure. The protrusion 261 according to the present exemplary embodiment may include a sloped corner portion 261d instead of the above-described corner portion 261c.

Referring to FIG. 13, when viewed from a planar structure, the protrusion 261 includes a pair of horizontal portions 261a configured to face each other with respect to the center C of the unit region SP and each including a side parallel to the first direction D1, a pair of vertical portions 261b configured to face each other with respect to the center C of the unit region SP and each including a side parallel to the second direction D2, and the sloped corner portion 261d including an oblique side Ec parallel to a direction that is oblique to the first and second directions D1 and D2. Except for the sloped corner portion 261d, characteristics of the protrusion 261 including the horizontal portion 261a, the vertical portion 261b, and the like are the same as in the aforementioned description, so herein, detailed descriptions will be omitted.

The sloped corner portion 261d is disposed in at least one corner of the unit region SP, and is interposed between the horizontal portion 261a and the vertical portion 261b adjacent to each other. The sloped corner portion 261d may be in a shape of substantially a triangle including the oblique side Ec. Two sides of the sloped corner portion 261d except the oblique side Ec may be substantially parallel to the first and second directions D1 and D2, respectively. The oblique side Ec of the sloped corner portion 261d, as illustrated in FIG. 13, may be connected to adjacent sides of the horizontal portion 261a and the vertical portion 261b, or spaced apart therefrom with a predetermined distance therebetween.

The pair of horizontal portions 261a, the pair of vertical portions 261b, and four sloped corner portions 261d may be connected to each other, and substantially constitute a closed curve. In this case, an outer circumference of the protrusion 261 may be substantially in a shape of a quadrangle.

The oblique side Ec of the sloped corner portion 261d may form an angle Ang2 with respect to the first direction D1 to be equal to or greater than about 40° and less than about 90°. Herein, the angle Ang2 is an acute angle. An extending direction of the oblique side Ec may cross the tilting directions a1, a2, a3, and a4 of the liquid crystal molecules 31 in subregions A1, A2, A3, and A4, respectively, and more specifically, an angle of the crossing may be substantially vertical.

Referring to FIG. 13 and FIG. 14, a distance d2 between the oblique side Ec of the sloped corner portion 261d and a vertex formed to face the oblique side Ec may be equal to or less than about 50% of a diagonal length of each of the subregions A1, A2, A3, and A4.

The horizontal portion 261a and the vertical portion 261b of the protrusion 261 may be formed around at least a part of a light transmitting region of the unit region SP. FIG. 13 illustrates an example in which the horizontal portion 261a and the vertical portion 261b of the protrusion 261 form a closed curve surrounding all of subregions A1, A2, A3, and A4 included in the unit region SP. The horizontal portion 261a and the vertical portion 261b of the protrusion 261 may correspond to a light blocking region surrounding a light transmitting region, and most of the sloped corner portion 261d may correspond to a light transmitting region. That is, a region at which the sloped corner portion 261d is positioned may transmit light to display an image.

Referring to FIG. 13 and FIG. 14, when viewed from a cross-sectional structure as in the above-described exemplary embodiment, the horizontal portion 261a and the vertical portion 261b of the protrusion 261 includes a lateral surface Sa that is a slope obliquely tilted with respect to a bottom surface of the protrusion 261, and the sloped corner portion 261d of the protrusion 261 includes a lateral surface Sb that is a slope obliquely tilted with respect to a bottom surface of the protrusion 261. Inclinations of the lateral surfaces Sa and Sb with respect to the bottom surface of the protrusion 261 may be different from each other, while an inclination of the lateral surface Sb with respect to the bottom surface of the protrusion 261 is more gentle than that of the lateral surface Sa.

A cross-sectional angle Ang3 between the lateral surface Sb of the sloped corner portion 261d and a bottom surface of the protrusion 261 may be in a range of about 1° to about 2°, but is not limited thereto, and may vary depending on a material characteristic or a manufacturing process of the protrusion 261.

A maximum height H2 of the sloped corner portion 261d from a bottom surface thereof, i.e., a maximum thickness, may be equal to or less than about 0.5 µm, but is not limited thereto, and may vary depending on a design condition. Particularly, the sloped corner portion 261d corresponds to a light transmitting region of each of subregions A1, A2, A3, and A4 of the unit region SP, so a thickness of the sloped corner portion 261d may be reduced to achieve a predetermined transmittance.

An outer circumference of the sloped corner portion 261d is connected to the horizontal portion 261a or the vertical portion 261b of the protrusion 261. A maximum thickness of the sloped corner portion 261 may be less than a maximum thickness of the horizontal portion 261a or the vertical portion 261b of the protrusion 261.

The oblique side Ec of the sloped corner portion 261d of the protrusion 261 is a bottom side of the lateral surface Sb of the sloped corner portion 261d.

When the alignment of the liquid crystal molecules 31 substantially perpendicular to a plane of the display panel 300 is determined as a reference alignment, the sloped corner portion 261d controls the liquid crystal molecules 31 adjacent to the lateral surface Sb to have a pretilt toward each interior portion of the subregions A1, A2, A3, and A4 even when an electric field is not generated in the liquid crystal layer. A pretilt direction of the liquid crystal molecules 31 is a direction forming an acute angle with respect to a reference alignment direction DR substantially perpendicular to the plane of the display panel 300, and such an acute pretilt angle Ap therebetween may be, for example, in a range of about 1° to about 2°.

The pretilt of the liquid crystal molecules 31 by the protrusion 261 may provide faster alignment of the liquid crystal molecules 31 disposed in each of the subregions A1, A2, A3, and A4 in the respective tilting directions a1, a2, a3, and a4 when an electric field is generated in the liquid crystal layer.

Particularly, since the direction perpendicular to the oblique side Ec of the sloped corner portion 261d substantially faces the center C of the unit region SP, the liquid crystal molecules 31 positioned around the sloped corner portion 261d already have a pretilt in the tilting directions a1, a2, a3, and a4 in which the liquid crystal molecules 31 are tilted when an electric field is generated in the liquid crystal layer. Accordingly, the liquid crystal molecules 31 may have a faster realignment speed, so response speed and transmittance thereof may be improved.

In the case in which the angle Ang2 formed between the oblique side Ec of the sloped corner portion 261d and the first direction D1 is about 45°, the sloped corner portion 261d may control the liquid crystal molecules 31 disposed in the subregions A1, A2, A3, and A4 to be aligned faster in a direction toward the center C thereof. In the case in which the angle Ang2 is greater than about 45°, the sloped corner portion 261d may control the liquid crystal molecules 31 to have an angle less than about 45° between the tilting directions a1, a2, a3, and a4 thereof and the first direction D1. In this case, since the liquid crystal molecules 31 may be tilted in a direction closer to the first direction D1 than the second direction D2 when an electric field is generated in the liquid crystal layer, side visibility may be improved.

If the liquid crystal layer of the display panel 300 is pressed by an external pressure, and thus alignment of the liquid crystal molecules 31 is disordered, even when the external pressure is removed, the alignment of the liquid crystal molecules 31 may not be recovered, thereby being seen as spots. However, according to the exemplary embodiment of the present disclosure, the protrusion 261 may control the alignment of the adjacent liquid crystal molecules 31 that are adjacent thereto in a predetermined direction. This facilitates the recovery of the liquid crystal molecules 31 in each of the subregions A1, A2, A3, and A4 to the original alignment direction. That is, after an external pressure is removed, the recovery speed at which the alignment of the liquid crystal molecules 31 returns from disorder is improved. Particularly, the sloped corner portion 261d of the protrusion 261 may support faster recovery to the tilting directions a1, a2, a3, and a4.

As such, according to the exemplary embodiment of the present disclosure, when an image is displayed by generating an electric field in the liquid crystal layer, the liquid crystal molecules 31 may be realigned faster in a target realignment direction by the action of by the protrusion 261, so the transmittance may be further improved, and an image closer to a target luminance may be displayed, thereby improving the display quality. Further, sufficient controllability of the liquid crystal molecules 31 may be secured without including an alignment aid to an alignment layer or a liquid crystal layer, unlike a conventional art, so a display device having improvements in liquid crystal alignment controllability and transmittance may be provided without adding a complex manufacturing process.

Figure 15:
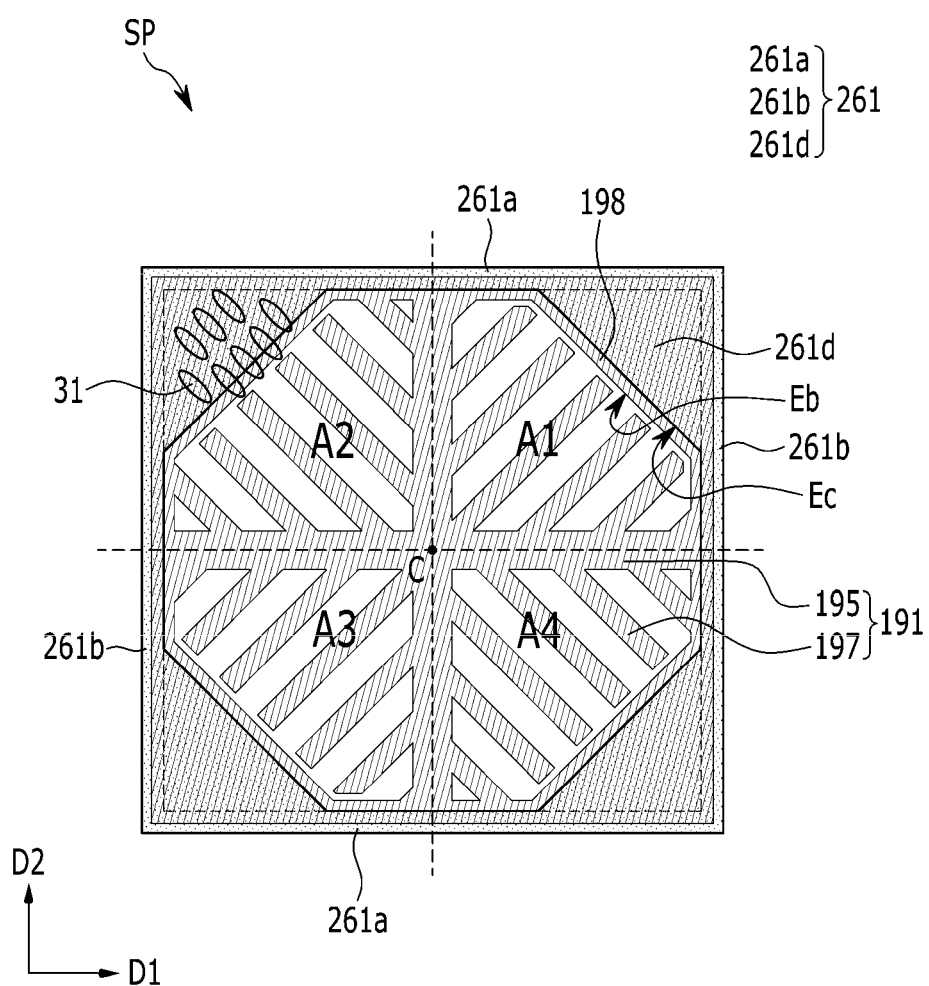
FIG. 15 is a top plan view illustrating a structure of a protrusion and a unit electrode portion in a unit region of a display device according to an exemplary embodiment of the present disclosure.

Next, referring to FIG. 15, a display device according to the present exemplary embodiment is the same as most of the aforementioned exemplary embodiment illustrated in FIG. 13 and FIG. 14, while a structure of the unit electrode portion 191 may be different.

The unit electrode portion 191 is the same as most of the aforementioned exemplary embodiment, while the unit electrode portion 191 may include at least one planar portion 198, disposed in at least one of four corners thereof as in the exemplary embodiment illustrated in FIG. 9. In the case in which the unit electrode portion 191 is of substantially a quadrangle, the planar portion 198 is disposed in at least one corner of a quadrangle. FIG. 15 illustrates an example in which each planar portion 198 is disposed on all of the four corners of the unit electrode portion 191.

A characteristic of the planar portion 198 is the same as that of the above-described exemplary embodiment illustrated in FIG. 9, so herein, detailed descriptions are omitted.

A distance d2 between the oblique side Ec of the sloped corner portion 261d and a vertex formed to face the oblique side Ec may be less than a distance between the oblique side Eb of the planar portion 198 and a vertex formed to face the oblique side Eb. That is, the oblique side Ec of the sloped corner portion 261d may be overlapped with an interior portion of the planar portion 198.

The oblique side Ec of the sloped corner portion 261d may be substantially parallel to the oblique side Eb of the planar portion 198.

In the case in which the unit electrode portion 191 includes the planar portion 198, liquid crystal alignment controllability may be improved by the action of a fringe field by the oblique side Eb of the planar portion 198, so transmittance of the display device may be further improved. Further, since the planar portion 198 may be formed in a shape of a unitary plate without an opening or the branches 197, the aforementioned dark space does not exist around the branches 197, so overall transmittance of the unit region SP may be improved.

Since a slit or the branches 197 is not formed on the planar portion 198, the controllability may not be sufficient when the liquid crystal molecules 31 are realigned. However, because at least a part of the planar portion 198 overlaps the sloped corner portion 261d, liquid crystal alignment controllability in the case of realigning the liquid crystal molecules 31 may be improved by a pretilt of the liquid crystal molecules 31 by the action of the sloped corner portion 261d. Accordingly, an alignment direction of the liquid crystal molecules 31 positioned to correspond to the planar portion 198 may be controlled effectively, so sufficient transmittance may be achieved.

In a manufacturing process of the display device according to an exemplary embodiment of the present disclosure, the protrusion 261 may be formed by coating an organic material and then by using a photolithographic process with exposure using a photomask and development. In this case, light transmittances of photomasks corresponding to the horizontal portion 261a and the vertical portion 261b of the protrusion 261 may be constant, and light transmittance of the photomask corresponding to the sloped corner portion 261d may be different from those of photomasks corresponding to the horizontal portion 261a and the vertical portion 261b. In the case in which the organic material has negative photosensitivity, such that a portion of the organic material to which light is irradiated remains, light transmittance of a photomask corresponding to the sloped corner portion 261d may be lower than light transmittances of photomasks corresponding to the horizontal portion 261a and vertical portion 261b, so less light may be irradiated to an organic material during an exposure process.

To make the lateral surface Sb of the sloped corner portion 261d gentle, a region of a photomask corresponding to the sloped corner portion 261d may have variable light transmittance according to a position therein. For example, in the case of a material having the negative photosensitivity, such that a portion to which light is irradiated remains, light transmittance of a photomask corresponding to the sloped corner portion 261d may decrease from a vertex configured toward the oblique side Ec of the sloped corner portion 261d toward the oblique side Ec. Light transmittance of a photomask corresponding to the sloped corner portion 261d may vary in a stepwise way or in a gradual way.

Besides such photolithography process, various methods for forming the protrusion 261 having different thicknesses according to a position therein may be employed.

Next, a structure of one pixel of a display device according to an exemplary embodiment of the present disclosure is described with reference to FIG. 16 to FIG. 20 along with the above-described drawings.

Figure 16:
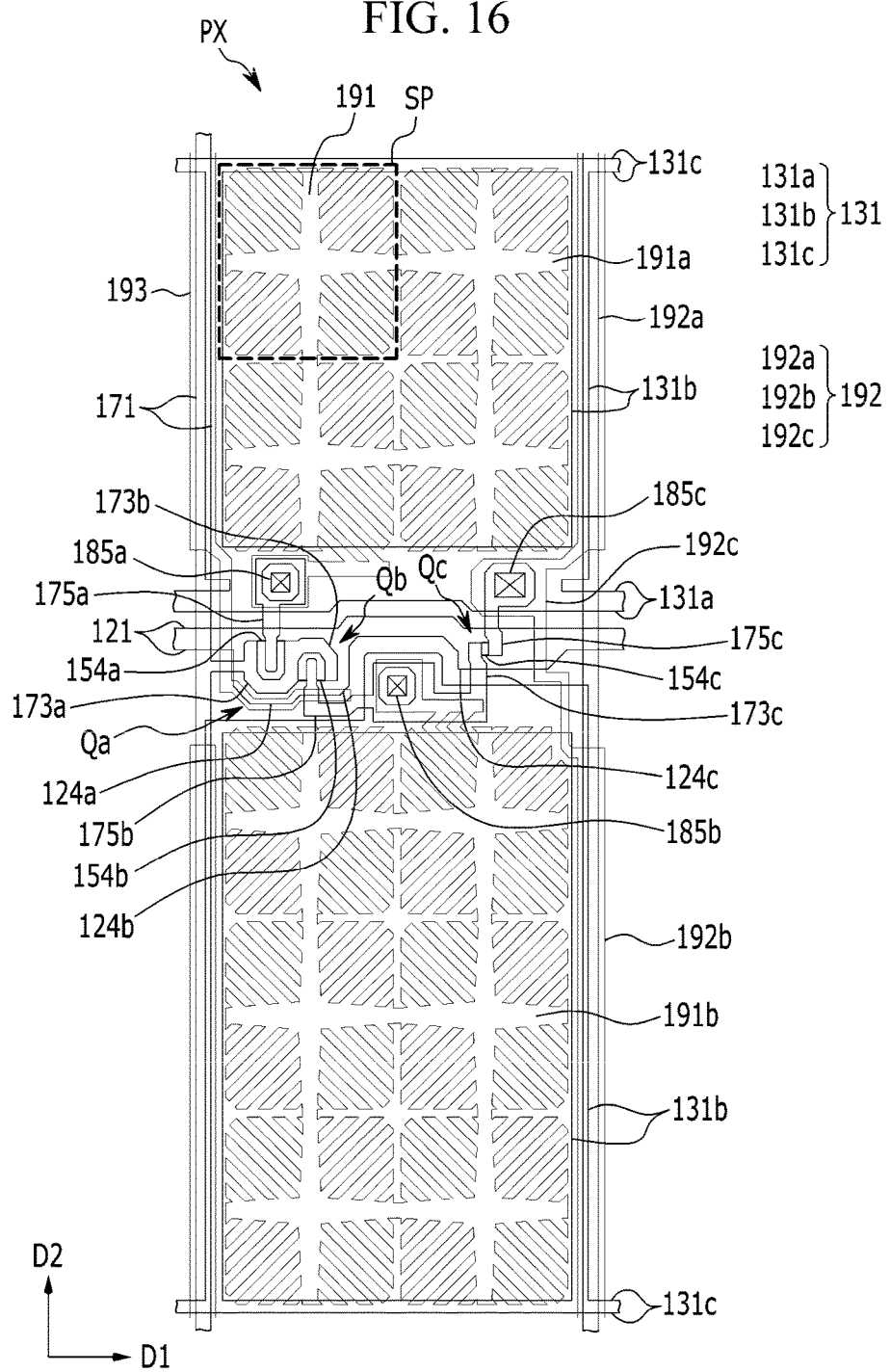
FIG. 16 is a layout view illustrating a pixel of a display device according to an exemplary embodiment of the present disclosure.
Figure 17:
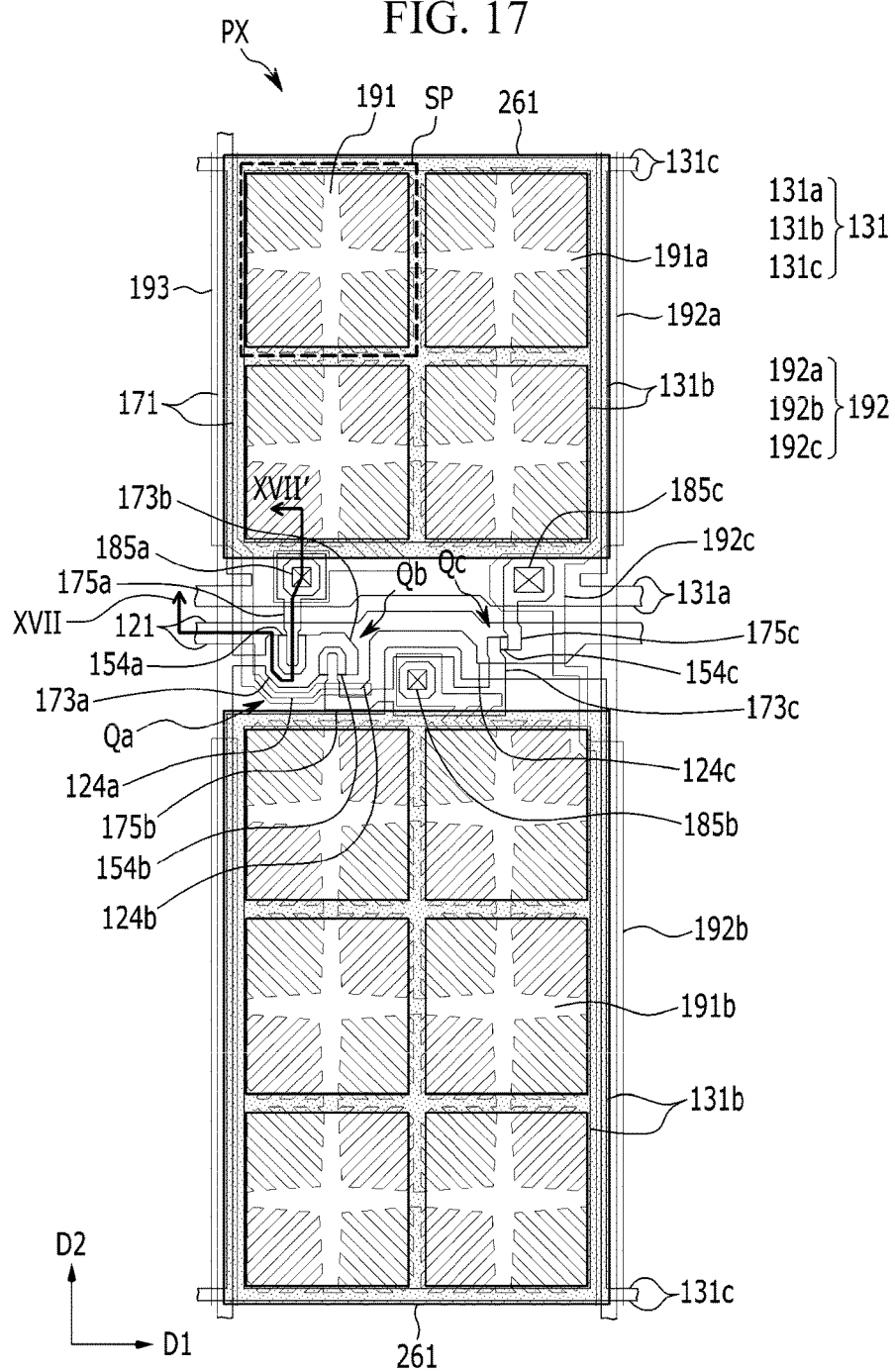
FIG. 17 is a layout view additionally illustrating a protrusion in the pixel of FIG. 16.
Figure 18:
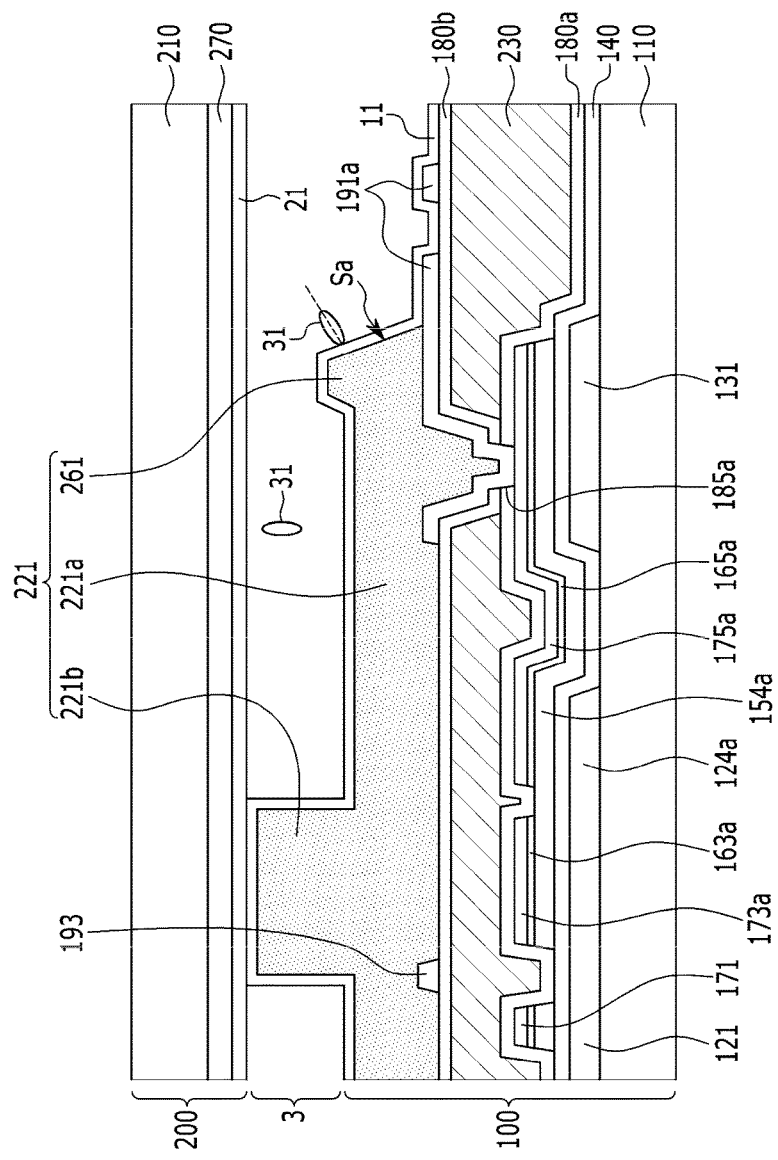
FIGS. 18, 19 and 20 are exemplary cross-sectional views of FIG. 17 taken along the line XVII-XVII'.

First, referring to FIG. 16 to FIG. 18, the display device according to the exemplary embodiment of the present disclosure is a liquid crystal display including the display panel 300. The display panel 300 may include a lower display panel 100 and an upper display panel 200 configured to face each other when viewed from a cross-sectional structure, and a liquid crystal layer 3 interposed therebetween.

The lower display panel 100 includes a substrate 110, and a plurality of gate lines 121 and a gate conductor including a reference voltage line 131 disposed on an inner plane of the substrate 110. Herein, an inner plane of the substrate 110 designates a plane configured to face the liquid crystal layer 3, and it designates the same hereinafter.

The gate line 121 mainly extends in the first direction D1, which is a horizontal direction, and includes a first gate electrode 124a, a second gate electrode 124b, and a third gate electrode 124c.

The reference voltage line 131 may be spaced apart from the gate lines 121, and may mainly extend in a direction parallel to the first direction D1. The reference voltage line 131 may transfer a reference voltage that may be an AC voltage or a constant DC voltage such as a common voltage $V_{com}$ or the like.

The reference voltage line 131 may include an extension portion 131a mainly extending in a horizontal direction, a vertical portion 131b protruding upward or downward from the extension portion 131a and mainly extending in a direction parallel to the second direction D2, and a horizontal portion 131c connected to the vertical portion 131b and mainly extending in the first direction D1.

A gate insulating layer 140 is disposed on the gate conductor, and a semiconductor layer including a first semiconductor 154a, a second semiconductor 154b, and a third semiconductor 154c is disposed thereon. The first semiconductor 154a and the second semiconductor 154b may be connected to each other. The first semiconductor 154a may overlap the first gate electrode 124a, the second semiconductor 154b may overlap the second gate electrode 124b, and the third semiconductor 154c may overlap the third gate electrode 124c.

The semiconductor layer may include amorphous silicon, polycrystalline silicon, an oxide semiconductor, or the like.

A plurality of ohmic contact elements 163a and 165a may be disposed on the semiconductor layer. The ohmic contact elements 163a and 165a may be formed of a silicide or a material such as n+ hydrogenated amorphous silicon doped with high density n-type impurities. The ohmic contact elements 163a and 165a may be omitted.

A plurality of data lines 171 including a first source electrode 173a and a second source electrode 173b, and a data conductor including a first drain electrode 175a, a second drain electrode 175b, a third source electrode 173c, and a third drain electrode 175c are disposed on the ohmic contact elements 163a and 165a and the gate insulating layer 140.

The data lines 171 may transfer a data signal and may mainly extend in the second direction D2, which is a vertical direction, and may cross the gate lines 121 and the reference voltage line 131.

The first source electrode 173a protrudes from the data lines 171 toward the first gate electrode 124a and is configured to face the first drain electrode 175a, and the second source electrode 173b protrudes from the data lines 171 toward the second gate electrode 124b and is configured to face the second drain electrode 175b.

The first source electrode 173a and the second source electrode 173b are connected to each other, and the second drain electrode 175b and the third source electrode 173c are connected to each other. The third source electrode 173c and the third drain electrode 175c are configured to face each other.

Among end portions of the third drain electrode 175c, an end portion that is not formed to face the third source electrode 173c may be adjacent to or may be overlapped with the reference voltage line 131.

The first gate electrode 124a, the first source electrode 173a, and the first drain electrode 175a constitute a first thin film transistor Qa as a first switching element along with the first semiconductor 154a. The second gate electrode 124b, the second source electrode 173b, and the second drain electrode 175b constitute a second thin film transistor Qb as a second switching element along with the second semiconductor 154b. The third gate electrode 124c, the third source electrode 173c, and the third drain electrode 175c constitute a third thin film transistor Qc as a voltage-dividing switching element along with the third semiconductor 154c.

Channels of the first thin film transistor Qa, the second thin film transistor Qb, and the third thin film transistor Qc are respectively formed in first, second, and third semiconductors 154a, 154b, and 154c that are interposed between first, second, and third source electrodes 173a, 173b, and 173c, and first, second, and third drain electrodes 175a, 175b, and 175c.

The gate lines 121, the reference voltage line 131, and the first to third thin film transistors Qa, Qb, and Qc may be disposed in the above-described thin film transistor region TRA.

A first insulating layer 180a is disposed on the data conductor and exposed parts of semiconductors 154a, 154b, and 154c. The first insulating layer 180a may be formed of an organic insulating material or an inorganic insulating material, and may include a single layer or a multi-layer.

An organic layer may be disposed on the first insulating layer 180a. For example, the organic layer may include a color filter 230. Light passing through the color filter 230 may display one color of primary colors, such as three primary colors, red, green, and blue, four primary colors, or the like. The colors displayed by the color filter 230 are not limited to the three primary colors including red, green, and blue, and may include one of primary color including cyan, magenta, yellow, or white series.

The color filter 230 may extend along each pixel array. The color filter 230 may include an opening (not illustrated) disposed on portions of the drain electrodes 175a, 175b, and 175c.

A second insulating layer 180b may be disposed on the color filter 230. The second insulating layer 180b may include an inorganic insulating material or an organic insulating material. The second insulating layer 180b serves as an overcoat for the color filter 230 and may prevent the color filter 230 from being exposed, so an impurity, such as a pigment of the color filter 230, may be prevented from flowing into the liquid crystal layer 3. The second insulating layer 180b may be omitted.

The first insulating layer 180a and the second insulating layer 180b include a first contact hole 185a exposing a part of the first drain electrode 175a and a second contact hole 185b exposing a part of the second drain electrode 175b. The first and second contact holes 185a and 185b may be respectively disposed in an opening of the color filter 230.

The gate insulating layer 140 and the first and second insulating layers 180a and 180b may further include a third contact hole 185c simultaneously exposing parts of the third drain electrode 175c and the reference voltage line 131.

A pixel electrode layer including a plurality of pixel electrodes and connecting electrodes 192 and 193 is disposed on the second insulating layer 180b.

A pixel electrode disposed in one pixel PX may be formed as one continuous electrode including all parts that are connected to each other, or may be formed to include a plurality of subpixel electrodes. In the present exemplary embodiment, descriptions are focused on an example in which a pixel electrode includes a first subpixel electrode 191a and a second subpixel electrode 191b.

One pixel PX, as described above, includes a plurality of unit regions SP. Accordingly, one pixel electrode may include a plurality of unit electrode portions 191 as in the above-described exemplary embodiments. Further, in the case in which one pixel electrode includes separated first and second subpixel electrodes 191a and 191b, each of the subpixel electrodes 191a and 191b may include a plurality of unit electrode portions 191 as in the above-described exemplary embodiments to secure sufficient liquid crystal alignment controllability. FIG. 16 and FIG. 17 illustrate an example in which the first subpixel electrode 191a includes four unit electrode portions 191 connected to each other and the second subpixel electrode 191b includes six unit electrode portions 191 connected to each other.

A number of unit electrode portions 191 included in one pixel PX may be variously determined according to an area of one pixel PX in consideration of liquid crystal alignment controllability.

The unit electrode portions 191 may be arranged substantially in a matrix form, and the unit electrode portions 191 that are adjacently disposed may be connected to each other by a connector (not illustrated). The connector may be disposed on an extending line of the cross-shaped stems 195 of the unit electrode portions 191.

A structure of the unit electrode portions 191 is the same as that of above-described exemplary embodiments, so herein, detailed descriptions are omitted.

Referring to FIG. 16, the cross-shaped stems 195 included in the unit electrode portions 191 may not have a constant width, but may have a width that is increased toward a center thereof, but are not limited thereto.

The first subpixel electrode 191a and the second subpixel electrode 191b may be configure to face each other with the gate line 121, the reference voltage line 131, and the first to third thin film transistors Qa, Qb, and Qc interposed therebetween, but a configuration thereof is not limited to the illustrated exemplary embodiments and may be modified in various ways.

The first and second subpixel electrodes 191a and 191b are physically and electrically connected to the first and second drain electrodes 175a and 175b through contact holes 185a and 185b, respectively. The first subpixel electrode 191a may receive a data voltage from the first drain electrode 175a, and the second subpixel electrode 191b may receive a voltage divided between a data voltage transferred through the second drain electrode 175b and a reference voltage transferred through the reference voltage line 131.

The third drain electrode 175c and the reference voltage line 131 may be electrically connected to each other in the third contact hole 185c through the connecting electrode 192.

The connecting electrode 192 may include a contact portion 192c contacting the third drain electrode 175c and a part of the reference voltage line 131, a vertical portion 192a extending upward from the contact portion 192c, and a vertical portion 192b extending downward from the contact portion 192c. The vertical portions 192a and 192b are spaced apart from the first and second subpixel electrodes 191a and 191b, and may extend in a direction substantially parallel to the second direction D2. The vertical portions 192a and 192b may be overlapped with the data lines 171. The vertical portions 192a and 192b electrically connect a plurality of reference voltage lines 131, so a variation of the reference voltage transferred by the reference voltage line 131 may be prevented. Further, the vertical portions 192a and 192b block an electric field generated by a data voltage of the data line 171 and prevent a voltage of an adjacent pixel electrode from being fluctuated by the variation of the data voltage.

The connecting electrode 193 may be disposed alternately with the connecting electrode 192 toward the first direction D1, and may be configured to face each other with a pixel electrode interposed therebetween. A structure and a function of the connecting electrode 193 may be substantially the same as those of the connecting electrode 192.

The pixel electrode layer may include a transparent conductive material such as indium tin oxide (ITO), indium zinc oxide (IZO), a metal thin film, or the like.

The structure of the pixel PX described above in the present exemplary embodiment is merely one example, and numerous variations are possible.

A light blocking member 221 is disposed on the pixel electrode layer. The light blocking member 221, which is also referred to as a black matrix, may block light transmission. Accordingly, a region at which the light blocking member 221 is formed is included in a light blocking region.

According to the present exemplary embodiment, the light blocking member 221 may include a main light blocker 221a, a spacer 221b, and the protrusion 261 as in the above-described exemplary embodiments.

The main light blocker 221a may include a part located in a light blocking region including regions at which the first to third thin film transistors Qa, Qb, and Qc are disposed, and may have a substantially flat upper surface. The main light blocker 221a may block light leakage between light transmitting regions at which the first and second subpixel electrodes 191a and 191b are respectively disposed, and between light transmitting regions of pixels PX adjacent to each other.

The main light blocker 221a may include a part covering the contact holes 185a, 185b, and 185c. The part may smoothen step portions between upper portions of the contact holes 185a, 185b, and 185c by filling the contact holes 185a, 185b, and 185c, to block light leakage therearound.

The spacer 221b may be connected to the main light blocker 221a, but the present exemplary embodiment is not limited thereto.

The spacer 221b is disposed in the light blocking region, and particularly, may be disposed on the upper portions of the first to third thin film transistors Qa, Qb, and Qc, and/or on the signal lines such as the gate line 121, the reference voltage line 131, and the data line 171.

The spacer 221b in a general state may serve as a main spacer maintaining and supporting a cell gap between the upper display panel 200 and the lower display panel 100, and may be a sub-spacer maintaining and supporting a cell gap between the upper display panel 200 and the lower display panel 100 in the case in which a distance between the upper display panel 200 and the lower display panel 100 becomes narrower when external pressure is applied to the display device. In the case in which the spacer 221b serves as the sub-spacer, an upper portion of the spacer 221b may not be in a contact with an internal surface of the upper display panel 200 when no pressure is applied.

The protrusion 261 is simply illustrated in FIG. 17 omitting details thereof, but may have structures according to those of above-described various exemplary embodiments. The liquid crystal molecules 31 adjacent to the lateral surface Sa of the protrusion 261 may have an initial alignment in a direction substantially perpendicular to the lateral surface Sa, and may mainly maintain the alignment state even when an electric field is not generated in the liquid crystal layer 3. Other characteristics and effects of the protrusion 261 are the same as those of the above descriptions, so herein, detailed descriptions are omitted.

The protrusion 261 is disposed in the same layer as the main light blocker 221a or the spacer 221b of the light blocking member 221, and may include the same material as the main light blocker 221a or the spacer 221b of the light blocking member 221. A maximum thickness of the protrusion 261 may be thicker than, similar to, or thinner than an average thickness of the main light blocker 221a. FIG. 18 illustrates an example in which a maximum thickness of the protrusion 261 is thicker than the main light blocker 221a therearound, but the present exemplary embodiment is not limited thereto.

The light blocking member 221 may be formed by using one photomask. Since the light blocking member 221 has various thicknesses as in the main light blocker 221a, the spacer 221b, and the protrusion 261, the photomask may have light transmittances that are differently adjusted according to a corresponding position. Specifically, in the case in which a material of the light blocking member 221 has negative photosensitivity, a region of a photomask corresponding to the spacer 221b having a maximum thickness may have highest light transmittance, and regions corresponding to the main light blocker 221a and the protrusion 261 may have lower light transmittance. In this case, the regions of the photomask corresponding to the main light blocker 221a and the protrusion 261 may have a halftone or a plurality of slits to control light transmittance. In the case in which thicknesses of the main light blocker 221a and the protrusion 261 are different from each other, a region of the photomask corresponding to a thicker one may have higher light transmittance than light transmittance of a region of the photomask corresponding to a thinner one.

Particularly, in the case in which the above-described protrusion 261 includes the sloped corner portion 261d, a photomask corresponding to the sloped corner portion 261d may have lower light transmittance than a photomask corresponding to other portions of the protrusion 261, for example, the horizontal portion 261a or the vertical portion 261b. As described above, a light transmittance of the photomask decreases toward a direction of decreasing thickness of the sloped corner portion 261d, so the sloped corner portion 261d may form a gentle inclination. As such, the region of the photomask having light transmittance that is gradually changed may be formed by gradually controlling a number of slits or a tonal strength of the halftone.

The light blocking member 221 may include a pigment, such as carbon black, and a photosensitive organic material.

In the case in which the color filter 230 and/or the light blocking member 221 along with first to third thin film transistors Qa, Qb, and Qc are disposed in the lower display panel 100 as in an exemplary embodiment of the present disclosure, alignments between the light blocking member 221 and the color filter 230, and between the pixel electrode and thin film transistors Qa, Qb, and Qc, may be facilitated, thereby reducing an alignment error.

An alignment layer 11 is disposed on the light blocking member 221, and the alignment layer 11 may be a vertical alignment layer.

The upper display panel 200 includes a substrate 210, and an opposed electrode 270 may be disposed on an inner surface of the substrate 210. The opposed electrode 270 may be formed in a shape of a planar unitary plate on an entire surface of the substrate 210. The opposed electrode 270 may transfer a common voltage $V_{com}$ having a constant voltage. The opposed electrode 270 may include a transparent conductive material, such as ITO and IZO, a metal thin film, or the like.

An alignment layer 21 is disposed on the opposed electrode 270, and the alignment layer 21 may be a vertical alignment layer.

The liquid crystal layer 3 includes a plurality of liquid crystal molecules 31. The liquid crystal molecules 31 may have negative dielectric anisotropy, and may be initially aligned in a direction that is substantially perpendicular to a plane of the substrates 110 and 210 when an electric field is not generated in the liquid crystal layer 3. The liquid crystal molecules 31, particularly the liquid crystal molecules 31 positioned around the protrusion 261, have a pretilt in a direction substantially perpendicular to a surface of the protrusion 261.

The pixel electrode and the opposed electrode 270 may control an alignment direction of the liquid crystal molecules 31 by generating an electric field in the liquid crystal layer 3 with an applied voltage to thereby display an image.

Figure 19:
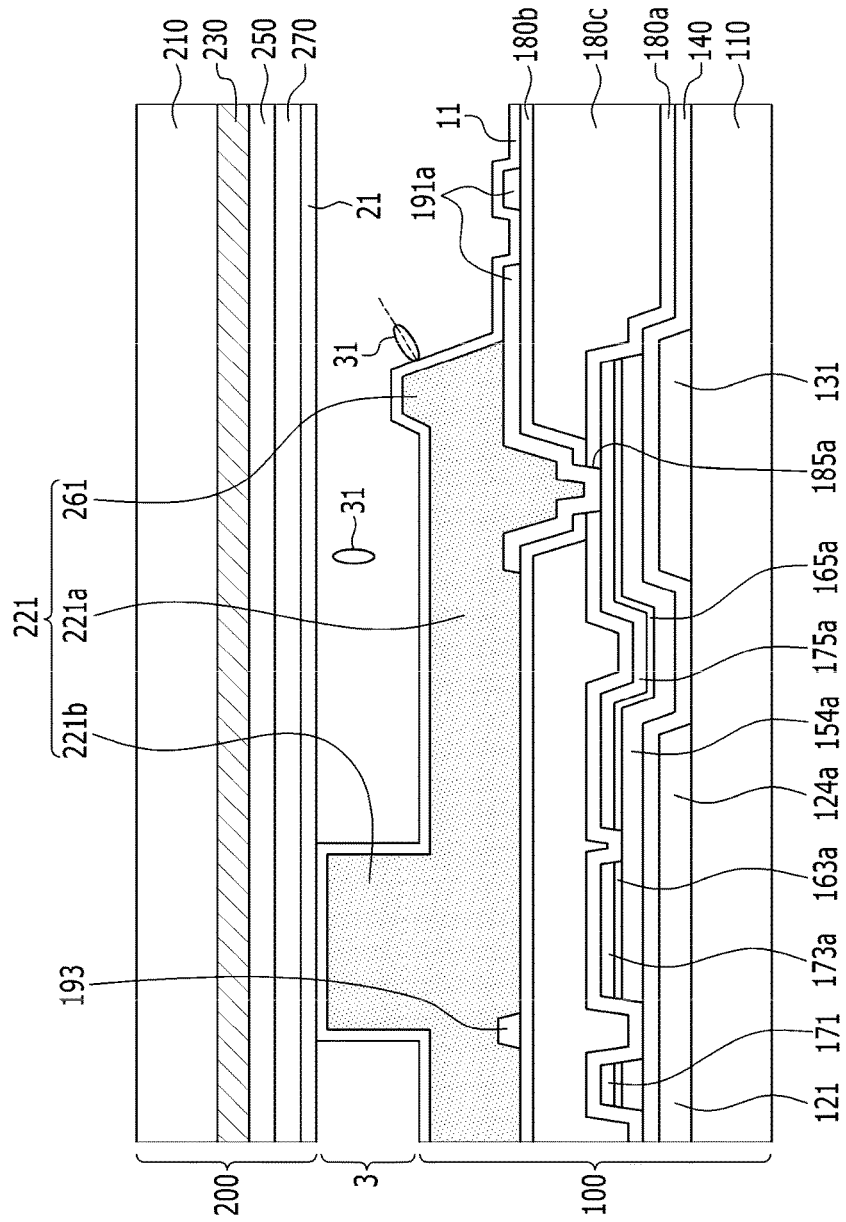

FIG. 19 illustrates a cross-sectional structure of a display device according to an exemplary embodiment that is different from the exemplary embodiment illustrated in FIG. 16 and FIG. 17. Referring to FIG. 19 along with FIG. 16 and FIG. 17, the present exemplary embodiment is the same as most of the aforementioned exemplary embodiment illustrated in FIG. 18, while the color filter 230 may be disposed in the upper display panel 200.

The lower display panel 100 may include a third insulating layer 180c interposed between the first insulating layer 180a and the second insulating layer 180b. The third insulating layer 180c may include an organic material and may provide a flat upper surface.

Figure 20:
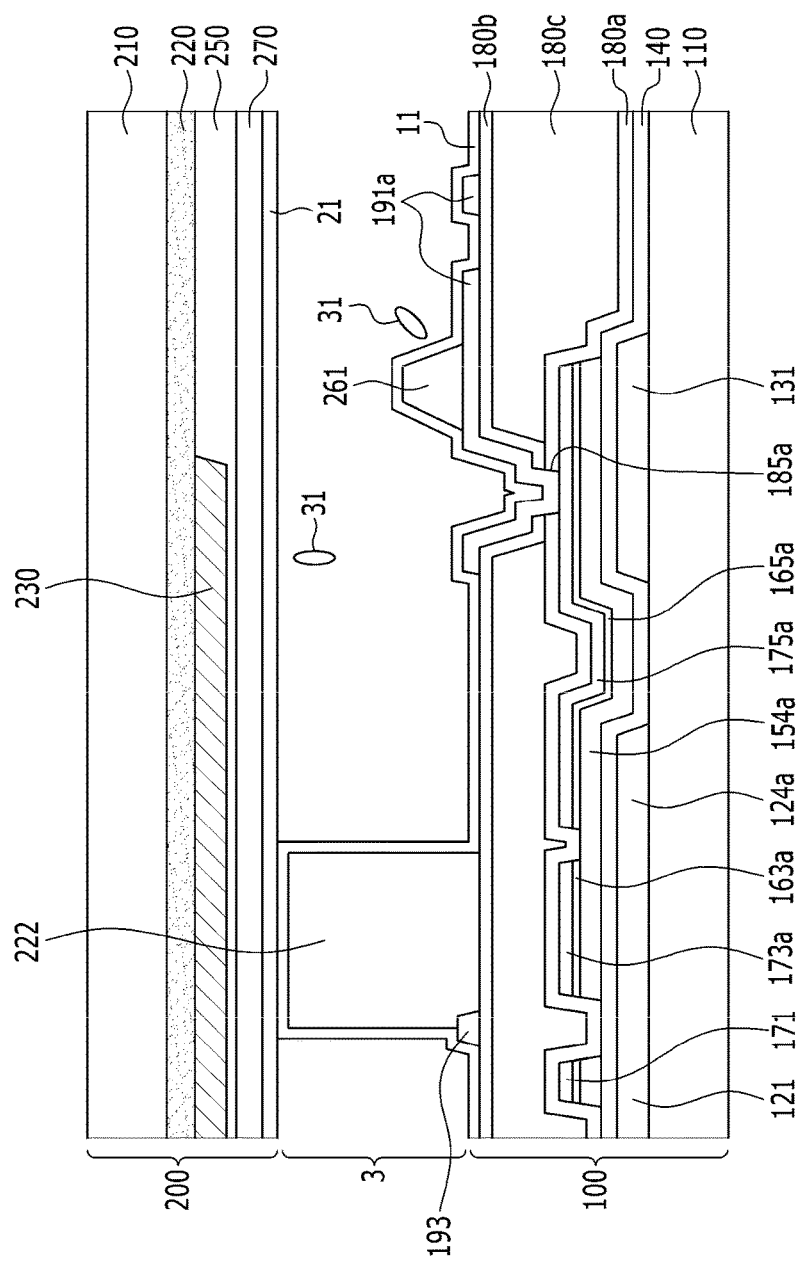

FIG. 20 illustrates a cross-sectional structure of a display device according to an exemplary embodiment that is different from exemplary embodiment illustrated in FIG. 16 and FIG. 17. Referring to FIG. 20 along with FIG. 16 and FIG. 17, the present exemplary embodiment is the same as most of the aforementioned exemplary embodiment illustrated in FIG. 19, while a light blocking member 220 may be disposed in the upper display panel 200. The light blocking member 220 may be interposed between the substrate 210, and the color filter 230 and may be disposed on the color filter 230. An overcoat 250 may be disposed on the light blocking member 220 and the color filters 230, and the opposed electrode 270 may be disposed on the overcoat 250. The light blocking member 220 may have a structure and a function that are similar to those of the above-described main light blocker 221a.

The lower display panel 100 is mostly the same as that of the above descriptions, while a spacer 222 and the protrusion 261 may be disposed on the pixel electrode layer.

The spacer 222 may have an island shape. The spacer 222 may be disposed in a light blocking region of the pixel PX, and particularly, may be disposed on upper portions of the first to third thin film transistors Qa, Qb, and Qc, and/or signal lines such as the gate line 121, the reference voltage line 131, and the data line 171. In addition, the spacer 222 may have a structure and a function that are similar to those of the above-described spacer 221b.

The protrusion 261 may have a structure and a function according to the various exemplary embodiments described above. The protrusion 261 is disposed in the same layer as the spacer 222, and may include the same material as the spacer 222. A maximum thickness of the protrusion 261 is less than a thickness of the spacer 222.

The protrusion 261 and the spacer 222 may be formed by using one photomask. For example, in the case in which a material forming the protrusion 261 and the spacer 222 has negative photosensitivity, a region of the photomask corresponding to the spacer 221b having a maximum thickness may have highest light transmittance, and a region of the photomask corresponding to the protrusion 261 may have lower light transmittance. In this case, the region of the photomask corresponding to the protrusion 261 may have a halftone or a plurality of slits to control light transmittance.

Particularly, in the case in which the above-described protrusion 261 includes the sloped corner portion 261d, a photomask corresponding to the sloped corner portion 261d may have lower light transmittance than a photomask corresponding to other portions of the protrusion 261, for example, the horizontal portion 261a or the vertical portion 261b. Further, as described above, light transmittance of the photomask decreases toward a direction of decreasing thickness of the sloped corner portion 261d, so the sloped corner portion 261d may form a gentle inclination. As such, the region of the photomask having light transmittance that is gradually changed may be formed by gradually controlling a number of slits or a tonal strength of the halftone.

A material included in the spacer 222 and the protrusion 261 may be transparent or may include a light blocking material. Even in the case in which the protrusion 261 includes a transparent material, a region at which the protrusion 261 is formed may not transmit most of the light, so may be mostly included in the light blocking region.

According to the exemplary embodiment of the present disclosure, the protrusion 261 may be interposed between the pixel electrode including the unit electrode portion 191 and the liquid crystal layer 3. However, in some cases, it may be disposed in a layer interposed between the substrate 110 and the pixel electrode. In the case in which the protrusion 261 is interposed between the substrate 110 and the pixel electrode, a step portion of the protrusion 261 is transferred to an upper layer of the protrusion 261, and thus an uppermost layer adjacent to the liquid crystal layer 3 protrudes to the liquid crystal layer 3, so liquid crystal molecules 31 may have a pretilt.

While the present system and method have been described in connection with exemplary embodiments, the present system and method are not limited to the disclosed embodiments but, on the contrary, cover various modifications and equivalent arrangements included within the spirit and scope of the appended claims.

DESCRIPTION OF SYMBOLS 100, 200, 300: display panel
191: unit electrode portion
220, 221: light blocking member
222: spacer
230: color filter
261: protrusion
270: opposed electrode

What is claimed is:

1. A display device comprising:
a first substrate including a plurality of unit regions;
a unit electrode portion disposed on the first substrate and disposed in one unit region of the plurality of unit regions;
an opposed electrode facing the unit electrode portion;
a liquid crystal layer including a plurality of liquid crystal molecules interposed between the unit electrode portion and the opposed electrode; and
a protrusion interposed between the first substrate and the liquid crystal layer and protruded toward the liquid crystal layer,
wherein the protrusion comprises:
a pair of horizontal portions facing each other with respect to a center of the unit electrode portion and including a side parallel to a first direction;
a pair of vertical portions facing each other with respect to the center of the unit electrode portion and including a side parallel to a second direction different from the first direction; and
at least one corner portion including a first oblique side parallel to a direction oblique with respect to the first and second directions.

2. The display device of claim 1, wherein the first oblique side and the first direction form an acute angle that is equal to or greater than about 40° and less than about 90°.

3. The display device of claim 2, wherein the horizontal portion and the vertical portion extend around at least a part of a light transmitting region included in the unit region.

4. The display device of claim 3, wherein the protrusion includes a first lateral surface obliquely tilted with respect to a bottom surface of the protrusion.

5. The display device of claim 4, wherein the unit region comprises a plurality of subregions at which the liquid crystal molecules are tilted in different directions from each other when an electric field is generated in the liquid crystal layer, and
the liquid crystal molecules disposed on the first lateral surface have a pretilt in a direction in which the liquid crystal molecules are to be tilted in each of the subregions.

6. The display device of claim 5, wherein the first lateral surface and the bottom surface of the protrusion form an angle in a range of about 40° to about 50°.

7. The display device of claim 6, wherein the protrusion is included in a light blocking region having lower light transmittance than the light transmitting region.

8. The display device of claim 5, wherein the unit electrode portion includes a stem disposed at a boundary between adjacent ones of the subregions and a plurality of branches connected to the stem, and
the branches are extended toward a different direction from the first and second directions.

9. The display device of claim 8, wherein the unit electrode portion includes at least one planar portion disposed in at least one corner of the unit electrode portion.

10. The display device of claim 9, wherein the planar portion includes a second oblique side extended toward an oblique direction with respect to the first direction, and
the second oblique side is disposed internally in the subregions.

11. The display device of claim 10, wherein the first oblique side overlaps the planar portion.

12. The display device of claim 11, wherein the second oblique side is spaced apart from the branches facing the second oblique side.

13. The display device of claim 8, wherein sides of end portions of the branches overlap the protrusion.

14. The display device of claim 5, wherein the first lateral surface and the bottom surface of the protrusion form an angle in a range of about 1° to about 2°.

15. The display device of claim 14, wherein a ratio of an occupied area of the corner portion in one corresponding subregion is equal to or less than about 50%.

16. The display device of claim 15, wherein the corner portion is included in the light transmitting region.

17. The display device of claim 16, wherein a maximum thickness of the corner portion is equal to or less than about 0.5 µm.

18. The display device of claim 14, wherein the unit electrode portion includes a stem disposed at a boundary between adjacent subregions and branches connected to the stem, and
the branches are extended toward a direction different from the first direction and the second direction.

19. The display device of claim 18, wherein the unit electrode portion includes at least one planar portion disposed in at least one corner of the unit electrode portion.

20. The display device of claim 19, wherein the planar portion includes a second oblique side extended toward an oblique direction with respect to the first direction, and
the second oblique side is disposed internally in the subregions.

21. The display device of claim 20, wherein the first oblique side overlaps the planar portion.

22. The display device of claim 21, wherein the second oblique side is spaced apart from the branches facing the second oblique side.

23. The display device of claim 18, wherein sides of end portions of the branches overlap the protrusion.

24. The display device of claim 1 further comprising:
a second substrate facing the first substrate with the liquid crystal layer interposed between the first substrate and the second substrate; and
a spacer disposed on the first substrate,
wherein the protrusion and the spacer are disposed in a same layer and include a same material.

25. The display device of claim 24 further comprising a main light blocker disposed in a same layer as the spacer and the protrusion, including a same material as the spacer and the protrusion, having a thickness of less than a thickness of the spacer,
wherein the main light blocker is disposed in a light blocking region.

26. The display device of claim 1, wherein the first oblique side is connected to a side of the horizontal portion or the vertical portion.

27. The display device of claim 1 further comprising a pixel configured to display an image in correspondence to one image signal, wherein the pixel includes a plurality of unit regions.

* * * * *